Sept. 4, 1928.
A. F. HANNEY
SORTING MACHINE
Filed March 27, 1925
1,683,249
16 Sheets-Sheet 4
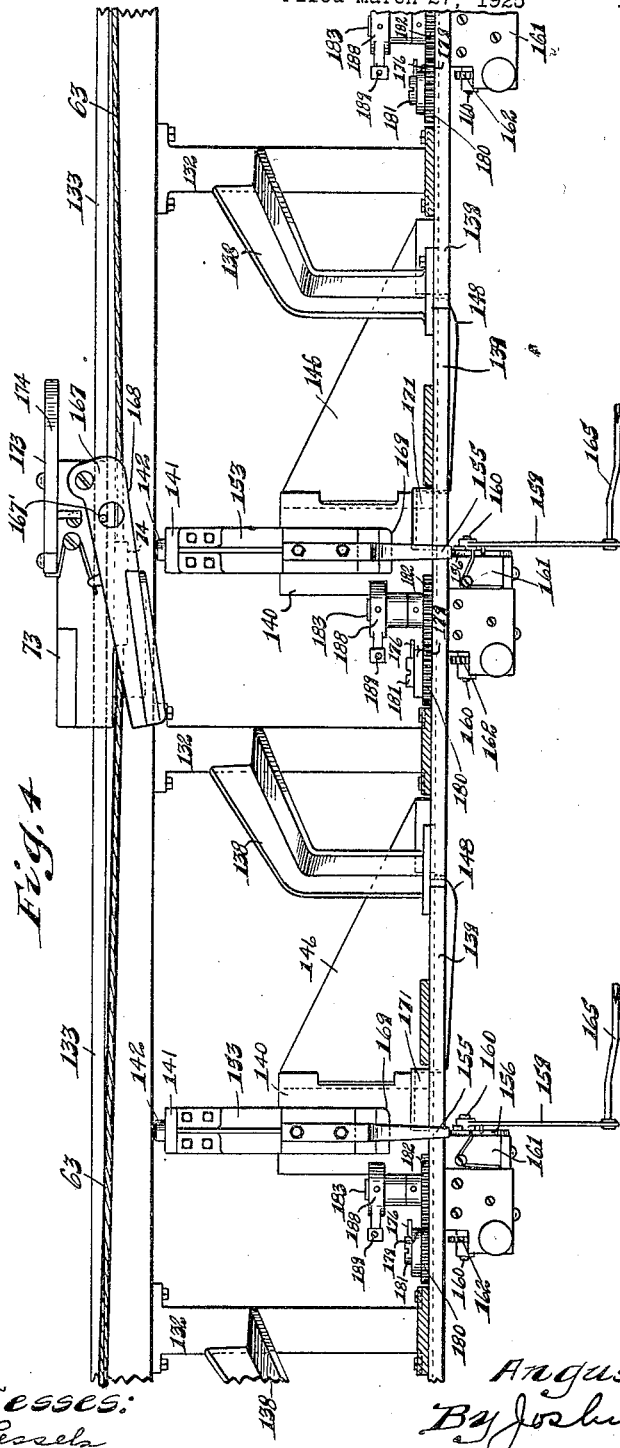
Witnesses:
C. E. Wessels
B. Y. Richards
Inventor:
Angus F. Hanney.
By Joshua R. H. Potts.
His Attorney.

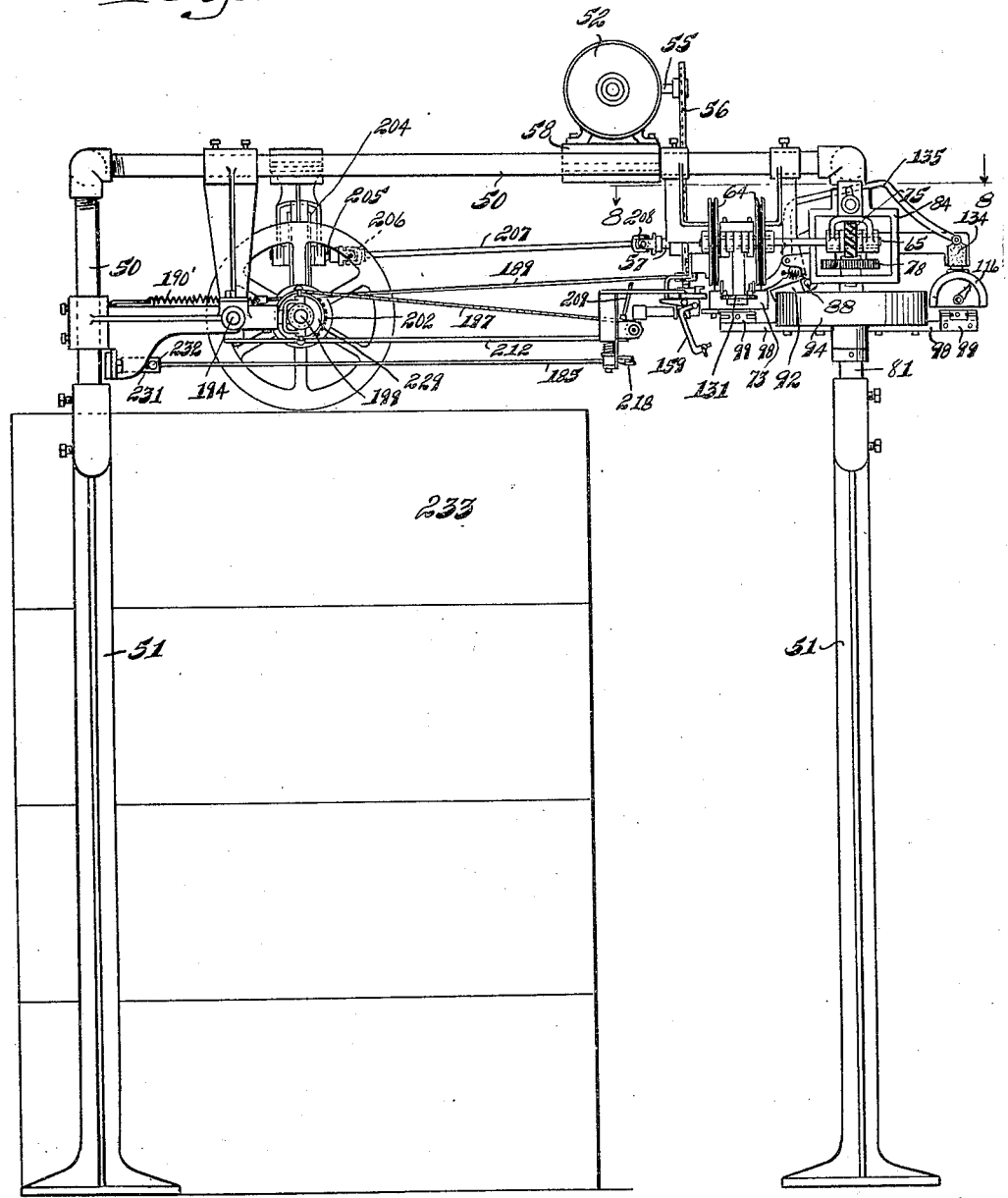

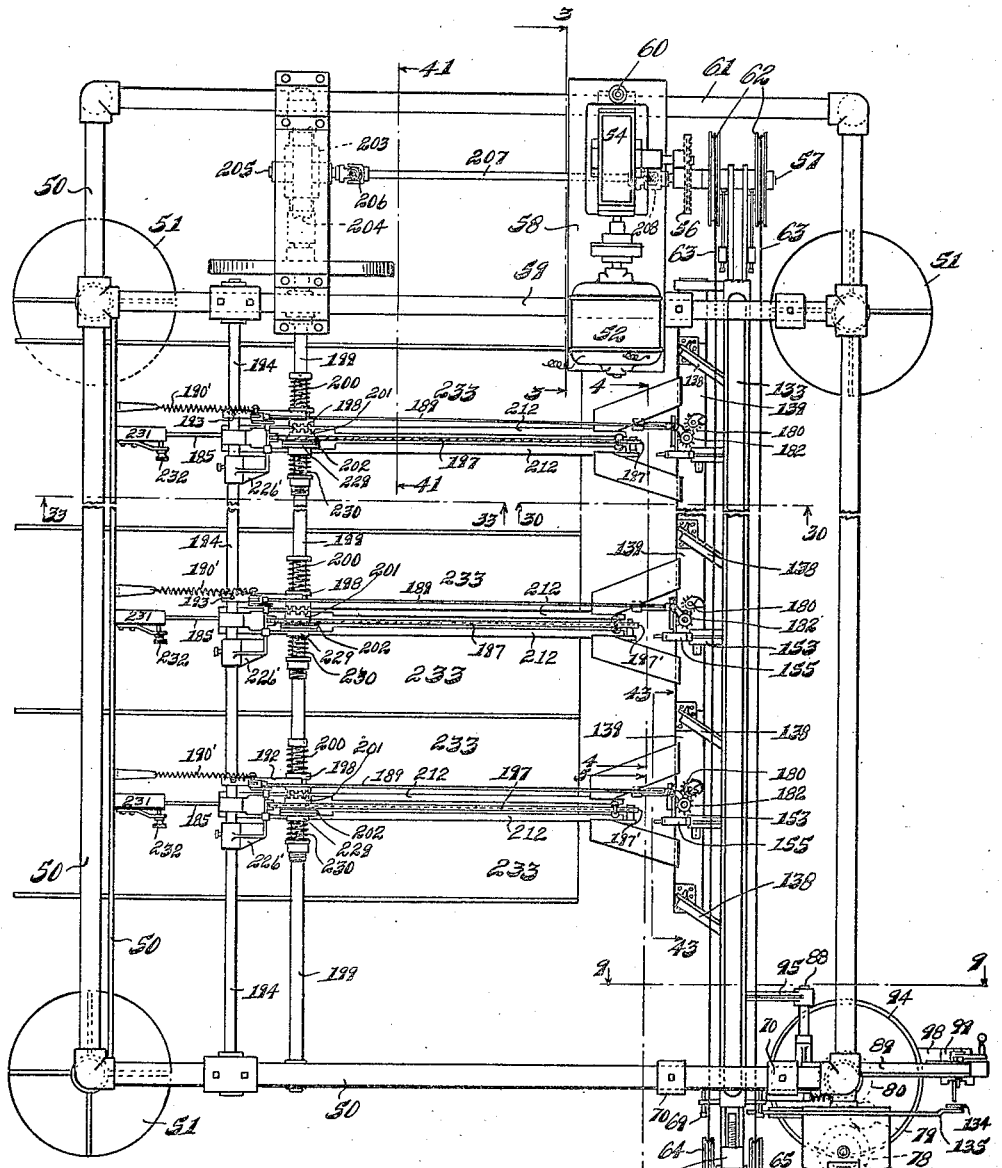

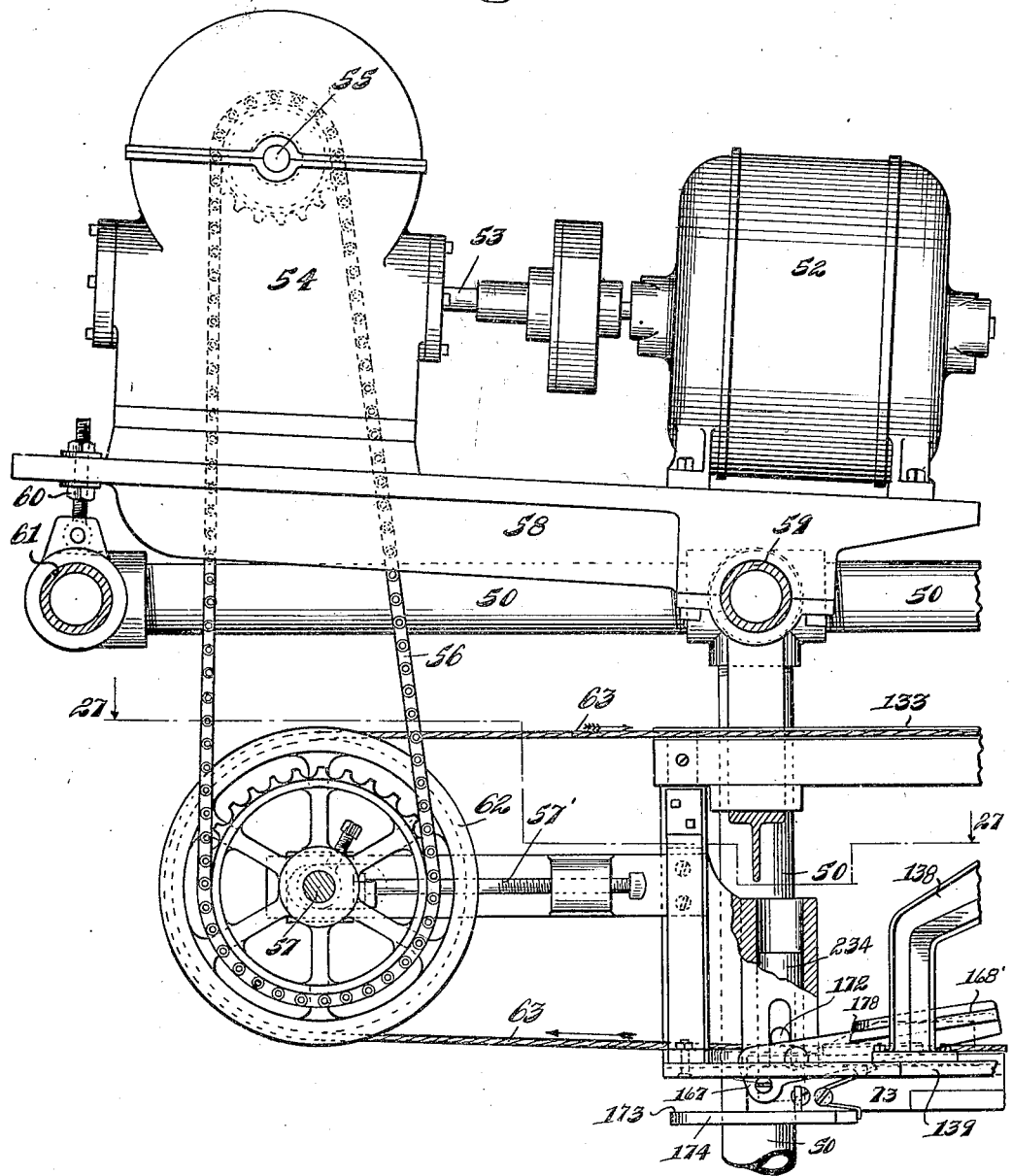

Sept. 4, 1928.  1,683,249
A. F. HANNEY
SORTING MACHINE
Filed March 27, 1925   16 Sheets-Sheet 5
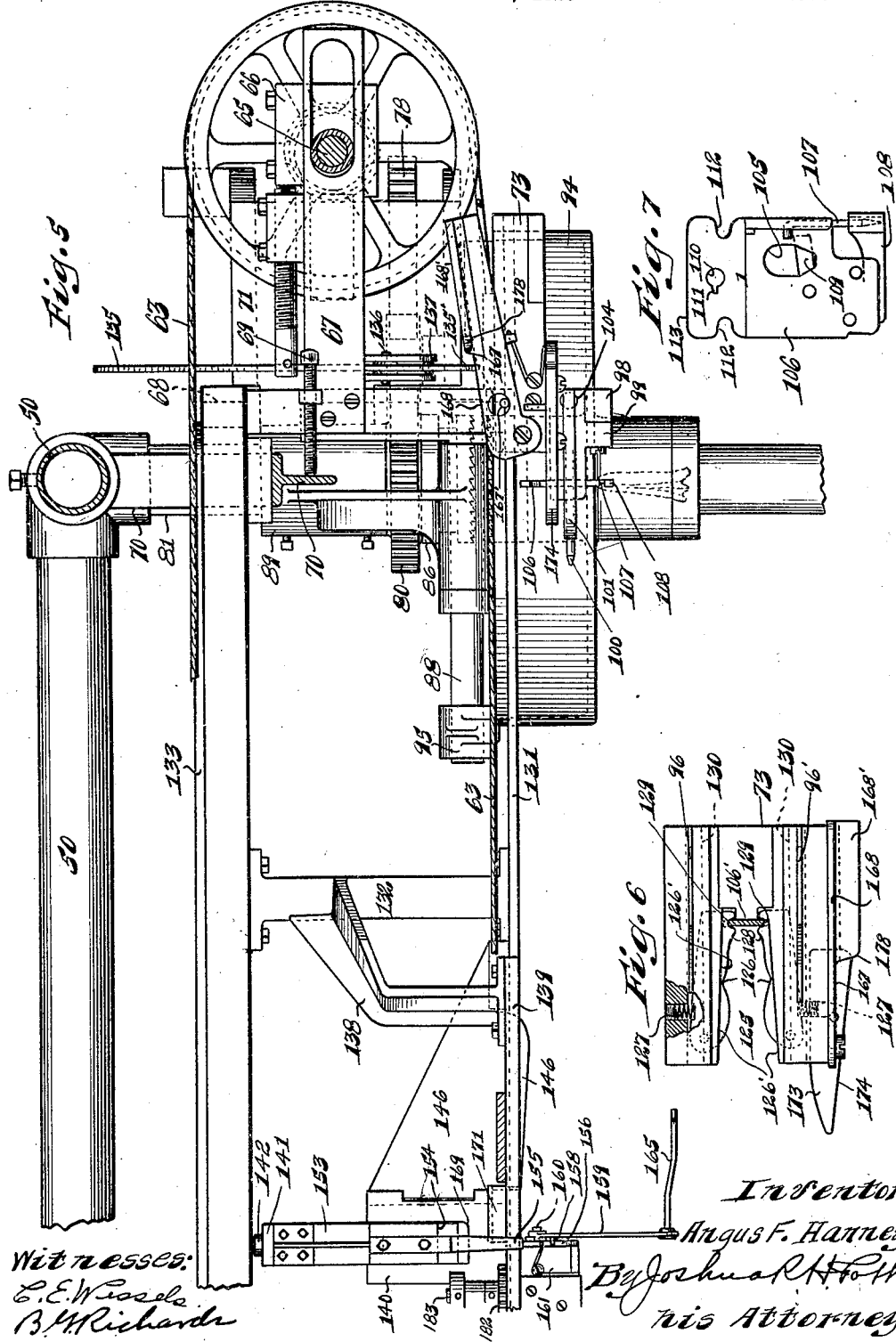

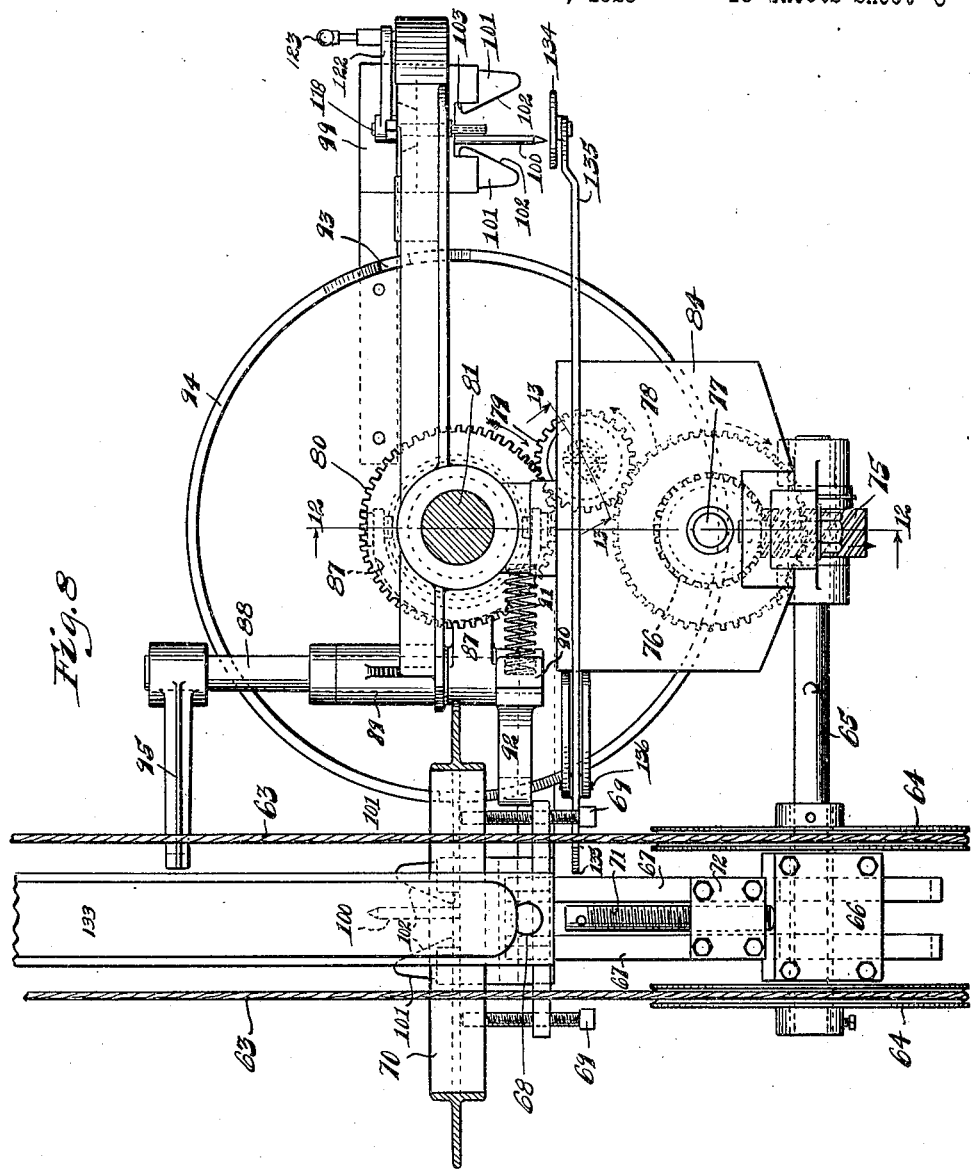

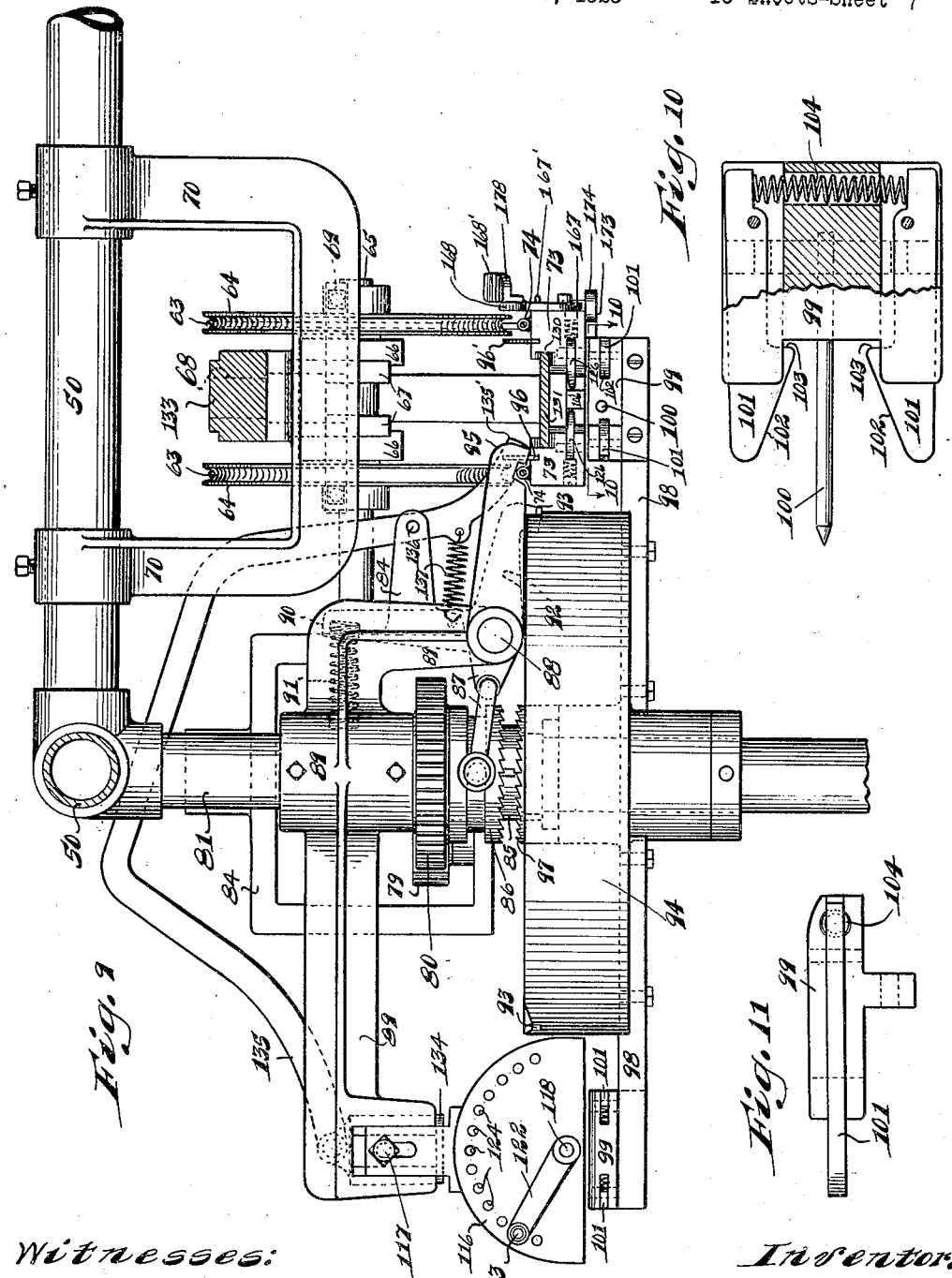

Sept. 4, 1928.
A. F. HANNEY
1,683,249
SORTING MACHINE
Filed March 27, 1925 16 Sheets-Sheet 8
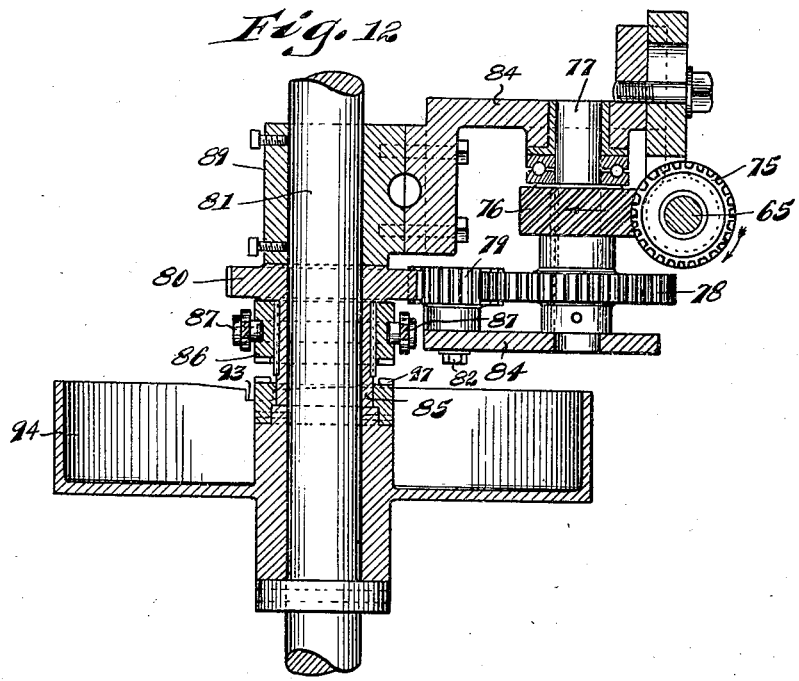
Fig. 12
Fig. 13
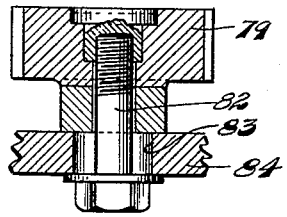
Witnesses:
C. E. Wessels
B. Y. Richards
Inventor:
Angus F. Hanney.
By Joshua R. H. Potts
his Attorney.

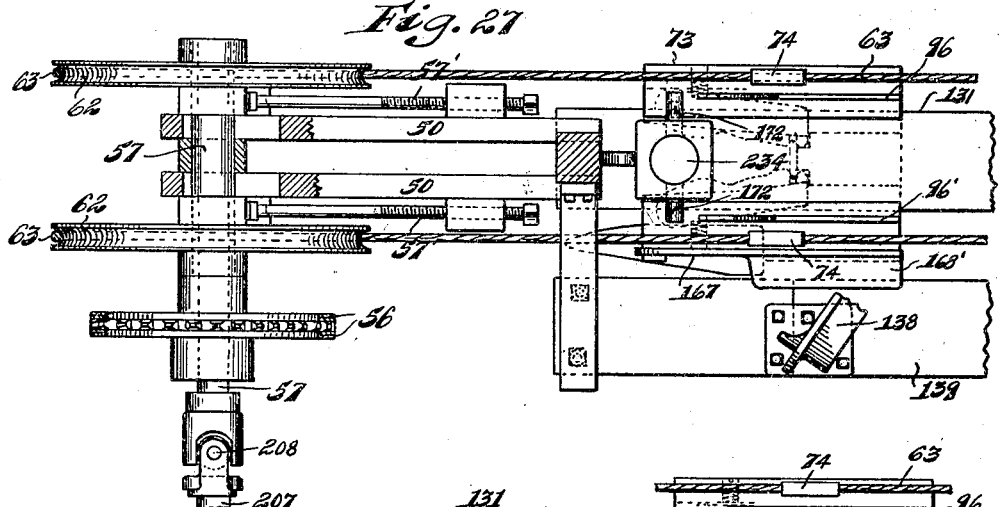

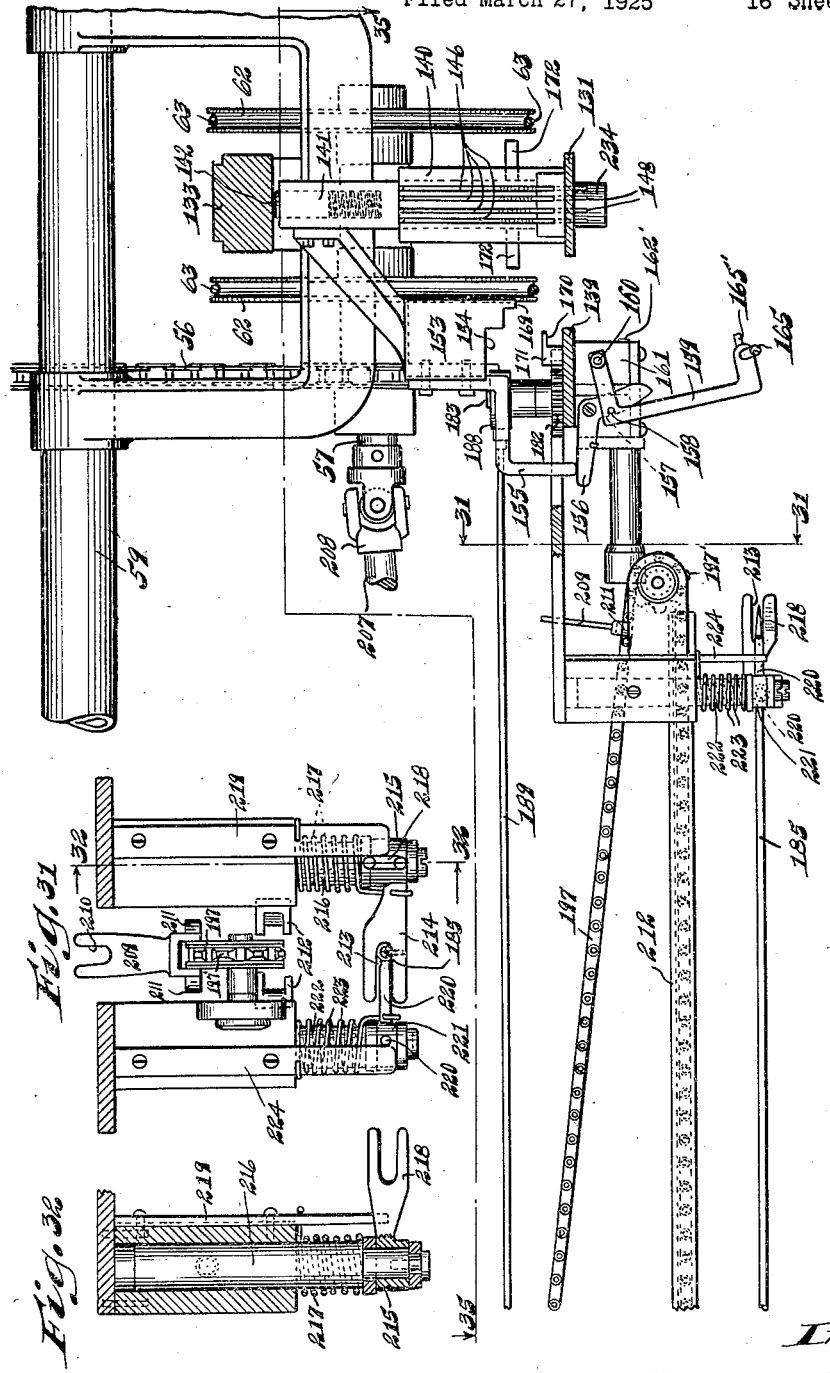

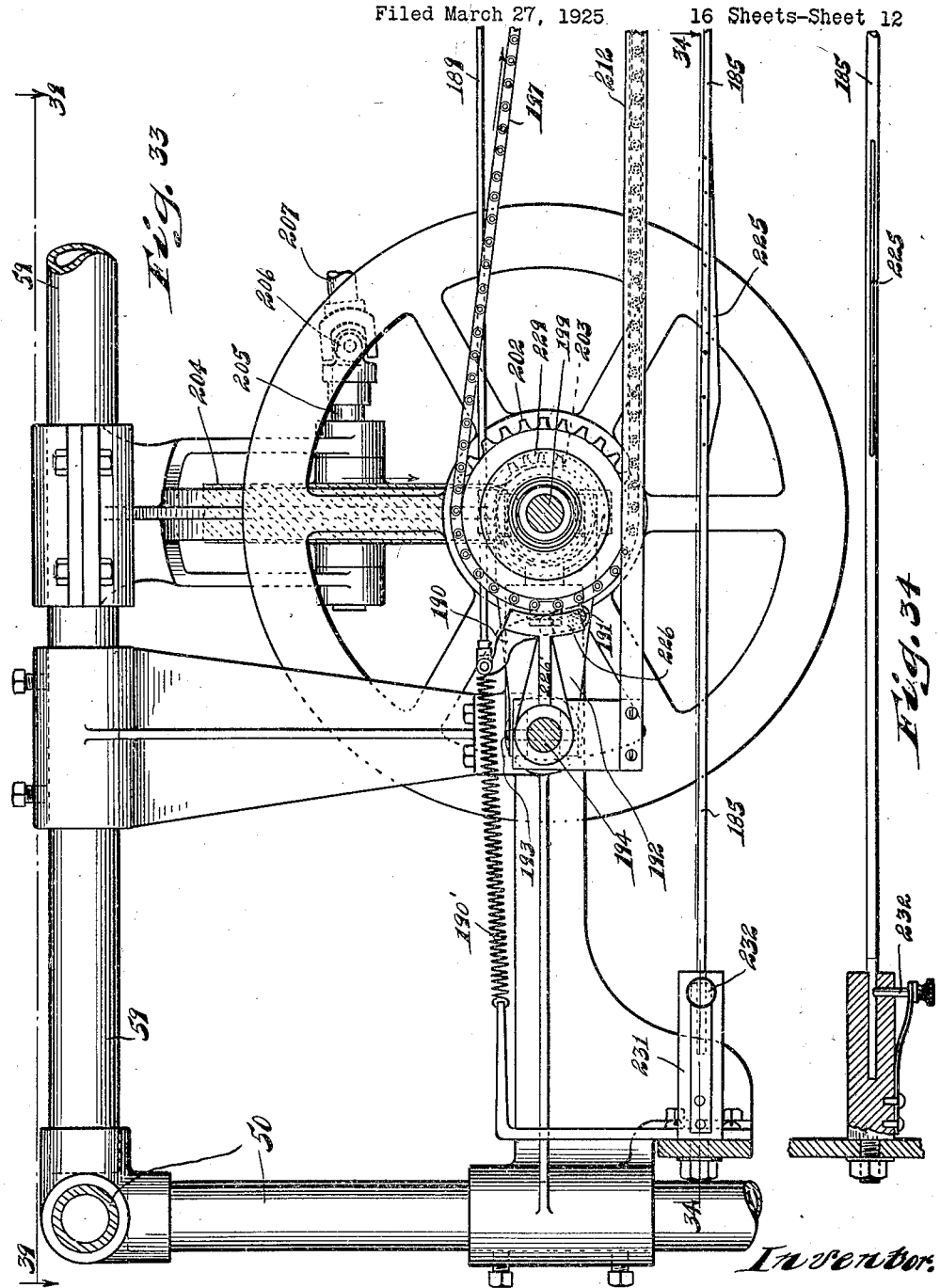

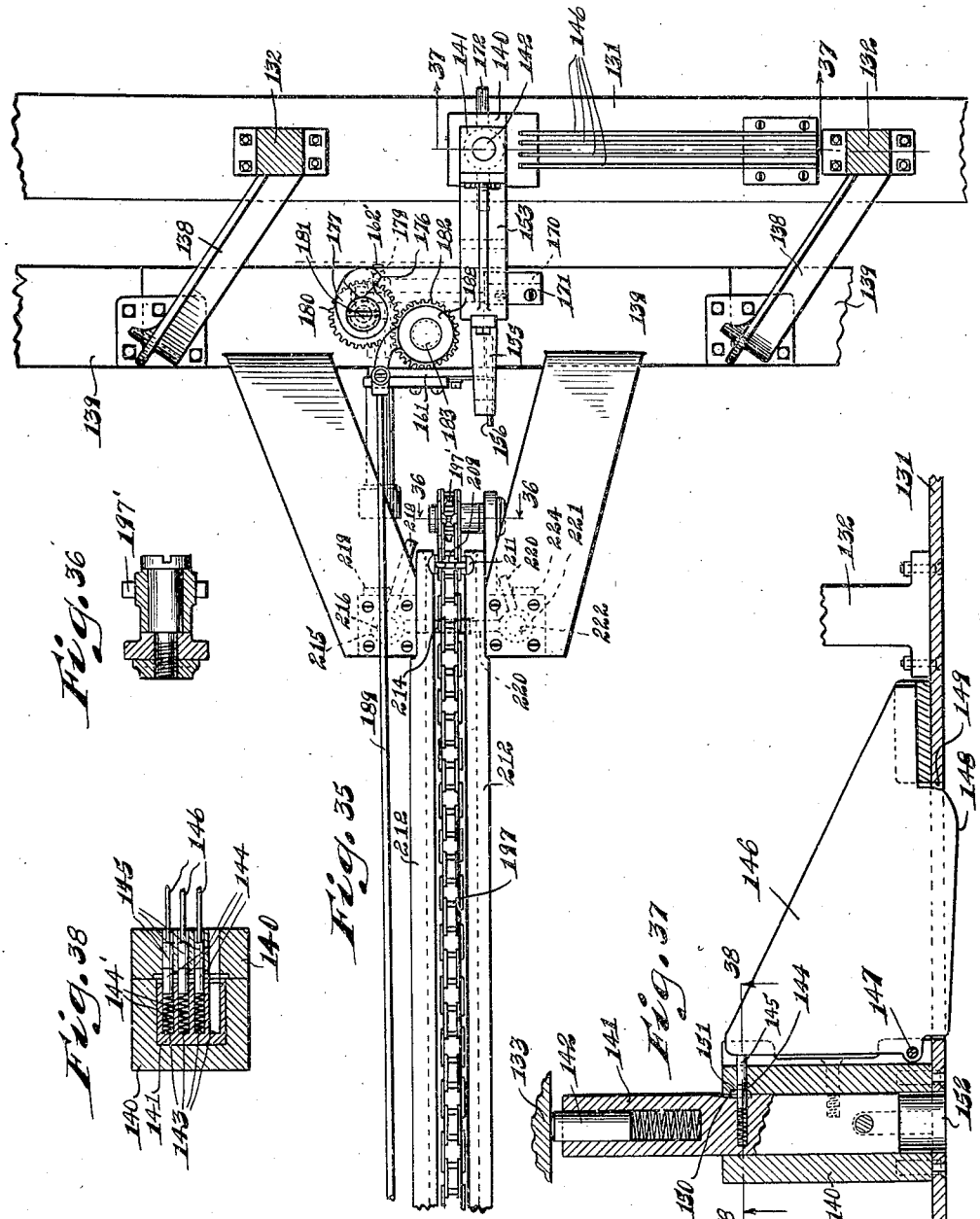

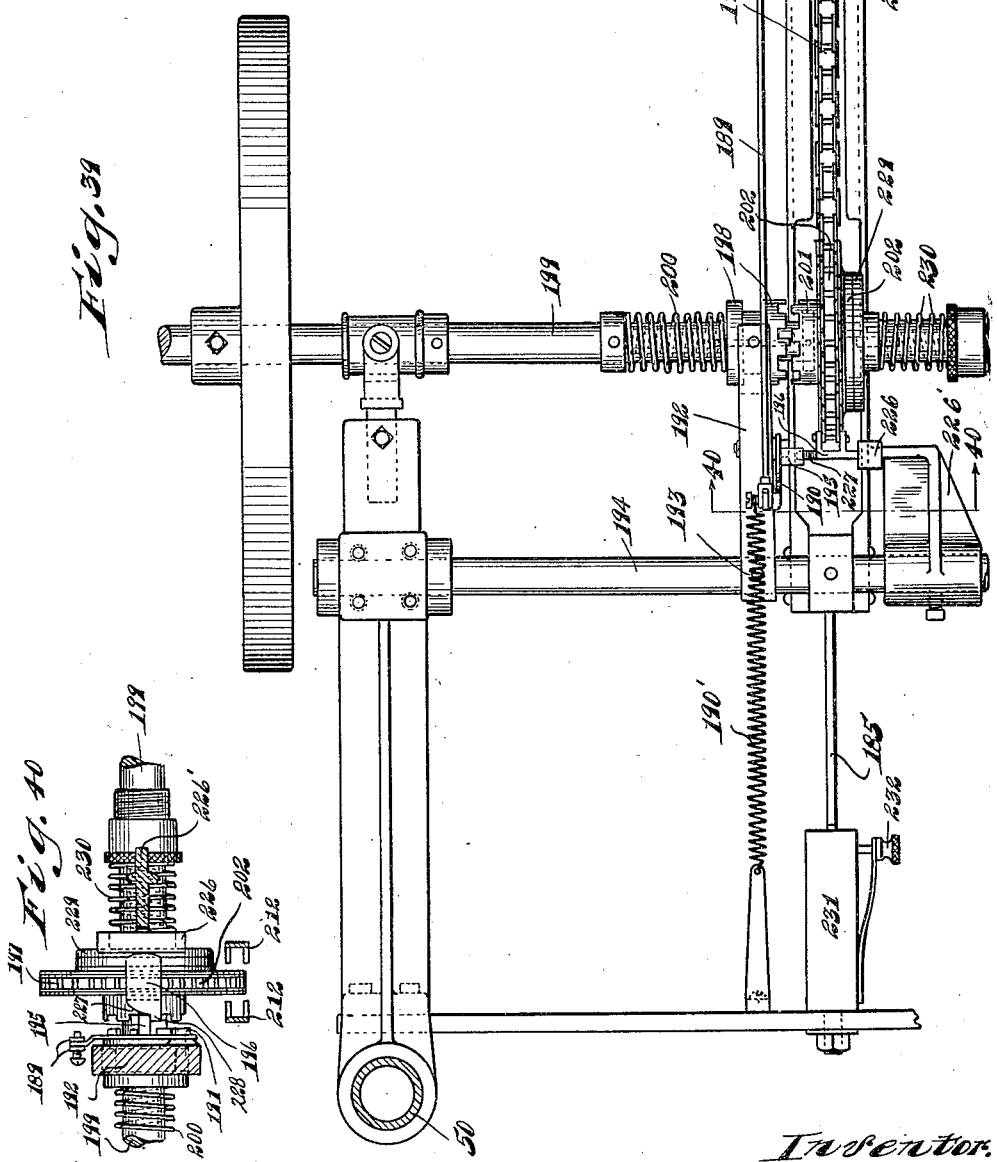

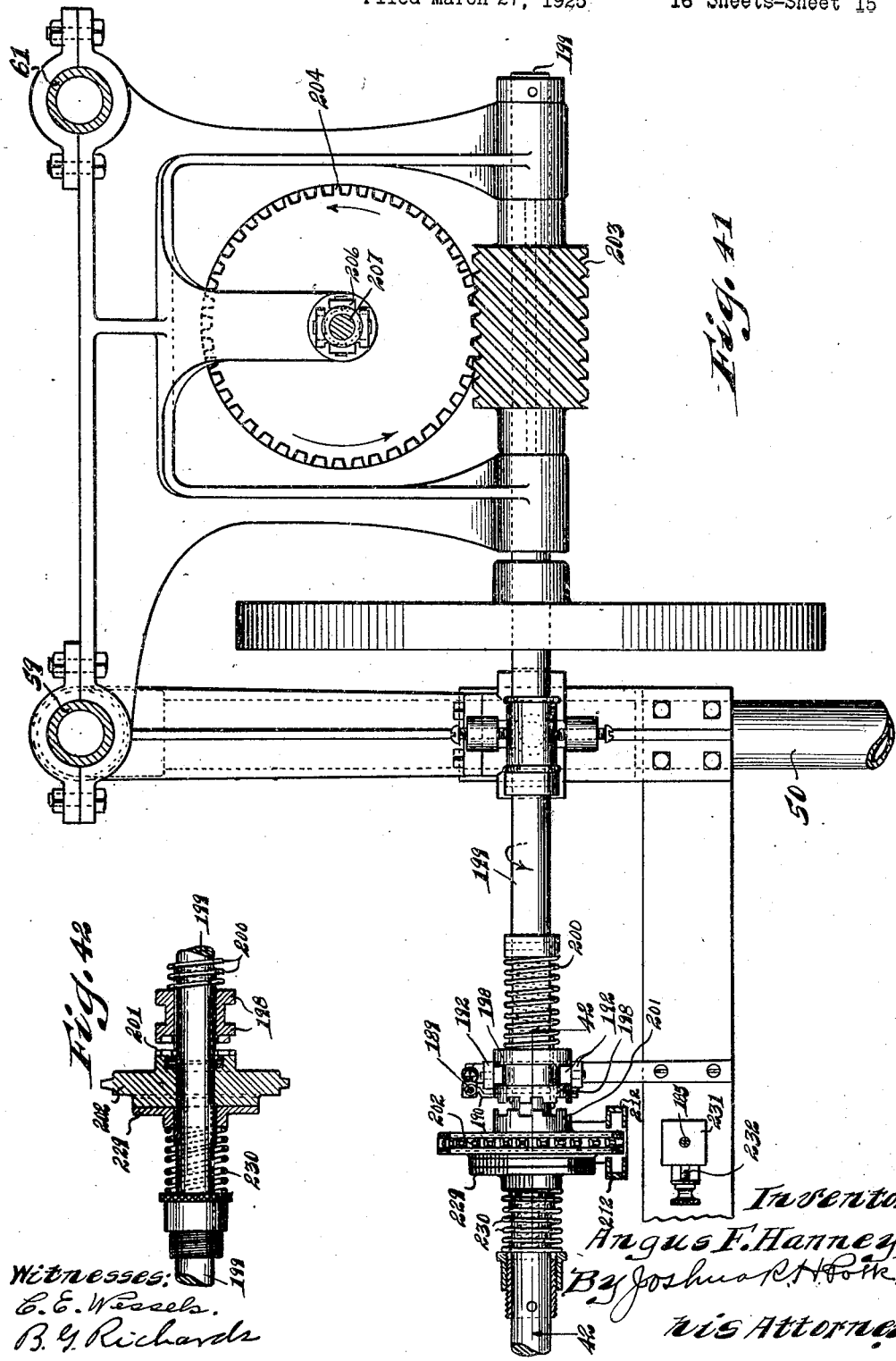

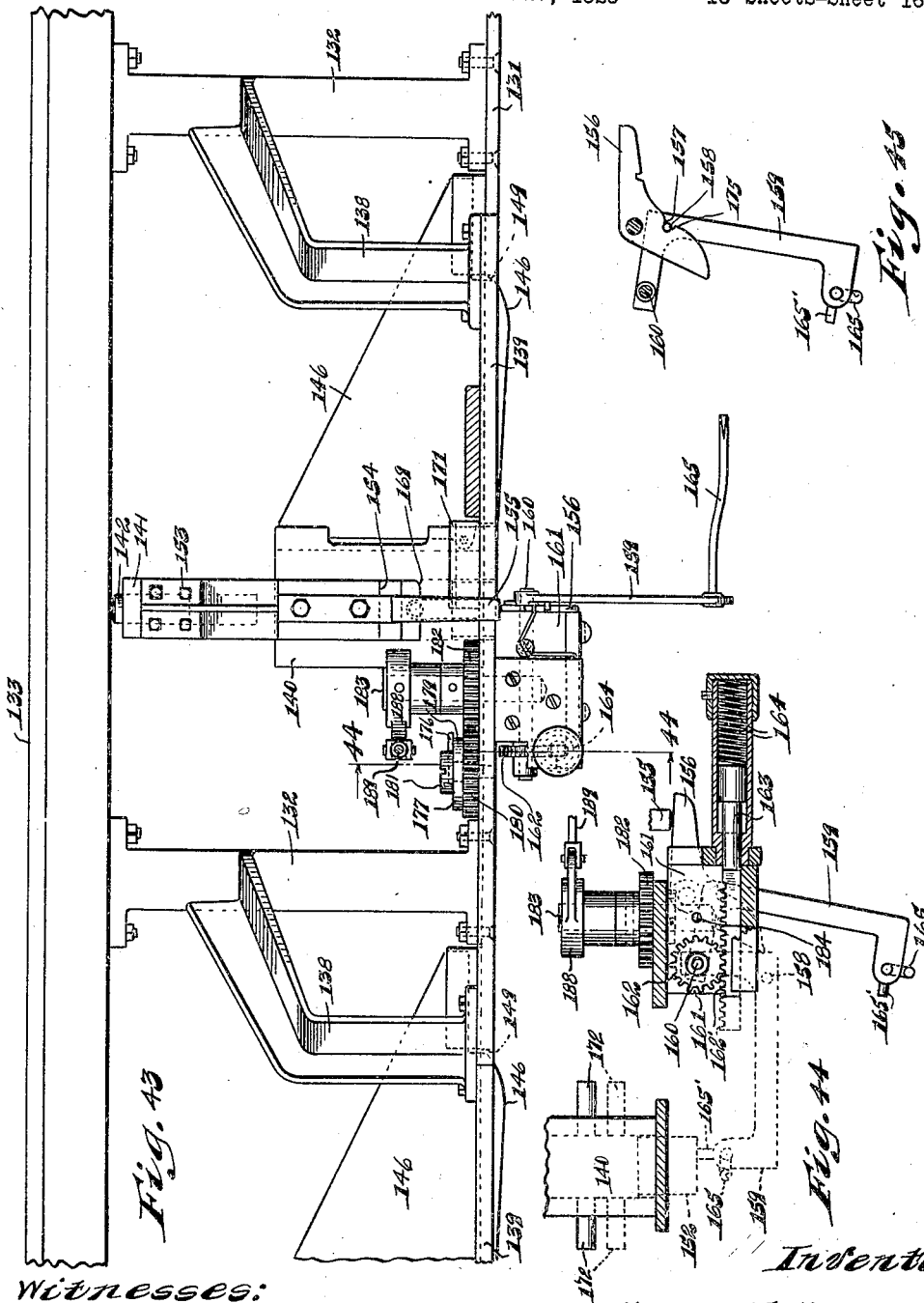

Patented Sept. 4, 1928.

1,683,249

UNITED STATES PATENT OFFICE.

ANGUS F. HANNEY, OF CHICAGO, ILLINOIS, ASSIGNOR TO GAMMELL-HANNEY MFG. CO., OF CHICAGO, ILLINOIS.

SORTING MACHINE.

Application filed March 27, 1925. Serial No. 18,669.

My invention relates to improvements in sorting machines, and has for its object the provision of an improved machine of this character especially adapted for use in laundries and arranged to sort automatically commingled articles such as laundry articles.

A further object of the invention is to provide such an improved machine which will also automatically sort and detach laundry tags or markers employed to identify the laundried articles.

Other objects will appear hereinafter.

The invention consists of the combinations and arrangements of parts hereinafter described and claimed.

The invention will be best understood by reference to the accompanying drawings forming part of the specification and in which Fig. 1 is a front elevation of a machine embodying the invention;

Fig. 2 is a partial top plan view of the same;

Fig. 3 is an enlarged section taken substantially on line 3—3 of Fig. 2;

Fig. 4 is an enlarged section taken substantially on line 4—4 of Fig. 2;

Fig. 5 is an enlarged section taken substantially on line 5—5 of Fig. 2;

Fig. 6 is a top plan view of one of three travelling carriages employed in the machine;

Fig. 7 is a detail view of a laundry tag or marker employed in conjunction with the machine;

Fig. 8 is an enlarged section taken substantially on line 8—8 of Fig. 1;

Fig. 9 is an enlarged section taken substantially on line 9—9 of Fig. 2;

Fig. 10 is an enlarged section taken substantially on line 10—10 of Fig. 9;

Fig. 11 is a side view corresponding with view 10;

Fig. 12 is a section taken substantially on line 12—12 of Fig. 8;

Fig. 13 is a section taken substantially on line 13—13 of Fig. 8;

Figure 14:
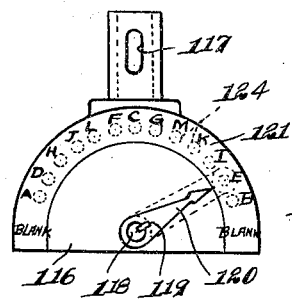
Fig. 14 is a detail view of an index plate employed in the machine.
Figure 15:
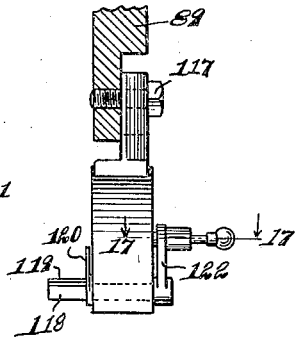
Fig. 15 is a side view corresponding with Fig. 14.

Figs. 18 to 26 inclusive are detail views of the upper portions of different laundry tags or markers employed in conjunction with the machine.

Fig. 27 is a section taken substantially on line 27—27 of Fig. 3;

Fig. 28 is a partial detail top plan view of one of the travelling carriages shown in position just preparatory to discharge of a laundried article and tag and associated parts;

Fig. 29 is an enlarged section taken substantially on line 29—29 of Fig. 28;

Fig. 30 is an enlarged section taken substantially on line 30—30 of Fig. 2;

Fig. 31 is an enlarged section taken substantially on line 31—31 of Fig. 30;

Fig. 32 is a section taken substantially on line 32—32 of Fig. 31;

Fig. 33 is an enlarged section taken substantially on line 33—33 of Fig. 2;

Fig. 34 is a view taken substantially on line 34—34 of Fig. 33;

Fig. 35 is a section taken substantially on line 35—35 of Fig. 30;

Fig. 36 is a section taken substantially on line 36—36 of Fig. 35;

Fig. 37 is a section taken substantially on line 37—37 of Fig. 35;

Fig. 38 is a section taken substantially on line 38—38 of Fig. 37;

Fig. 39 is a top plan view taken substantially on line 39—39 of Fig. 33;

Fig. 40 is a section taken on line 40—40 of Fig. 39;

Fig. 41 is an enlarged section taken substantially on line 41—41 of Fig. 2;

Fig. 42 is a section taken substantially on line 42—42 of Fig. 41;

Fig. 43 is an enlarged section taken substantially on line 43—43 of Fig. 2;

Fig. 44 is a section taken substantially on line 44—44 of Fig. 43; and

Fig. 45 is a detail view of a swinging arm and detent employed in the mechanism illustrated in Fig. 44.

The preferred form of construction as illustrated in the drawings comprises a suitable frame 50 mounted on adjustable legs or standards 51 whereby said frame 50 may be readily adjusted into level position at a considerable distance above the floor of the room in which the machine is mounted.

As best illustrated in Figs. 2 and 3 the machine is driven by an electric motor 52 having its shaft 53 extended into a gear box 54 containing a usual arrangement of reducing gears for driving the shaft 55 at a very much reduced speed. The shaft 55 is connected by a sprocket chain 56 with a shaft 57 which constitutes the main or master driving shaft of the machine and whereby the shaft 57 is driven at a comparatively slow speed by the motor 52. The motor 52 and the gear box 54 are mounted on a tilting frame 58 pivoted on a cross-bar 59 of the machine frame. At its rear end the frame 58 is connected by means of an adjustable link arrangement 60 with the cross-bar 61 of the machine frame and whereby the frame 58 may be adjusted to tighten or loosen the sprocket chain 56 as desired.

As best shown in Figs. 2, 3 and 5, the shaft 57 carries two adjacent grooved driving pulleys or wheels 62 and two parallel steel cables 63 are extended over the pulleys 62 and also over corresponding pulleys 64 mounted on a counter-shaft 65 at the extreme front of the machine, said cables 63 thus extending substantially through the length of the machine at one side thereof as shown and constituting in substance and effect an endless travelling conveyor. Adjusting screws 57' are provided in association with the bearings for shaft 57 whereby said shaft 57 may be adjusted to tighten the cables 63.

As best shown in Figs. 2, 5 and 8, shaft 65 is mounted in a bearing block 66 slidable on a frame 67 which is pivoted on trunnions 68 on the main frame of the machine. Adjusting screws 69 are also carried by the frame 67 and rest against a yoke or hanger 70 of the main frame of the machine and whereby the shaft 65 may be nicely adjusted angularly. An adjusting screw 71 is threaded on a block 72 on the frame 67 and rests against the rear side of the bearing block 66 and whereby the shaft 65 may be nicely adjusted in the frame 67. The cables carry three travelling carriages 73 best illustrated in Figs. 5, 6 and 9, said carriages being provided on their upper sides with sleeves or sockets 74 which are welded or otherwise secured to said cables 63 and said carriages being equally spaced on said cables so as to travel continuously through said machine at substantially equal distances apart, the adjustments for shaft 65 permitting of delicate adjustments of the paths of travel of these carriages.

As best illustrated in Figs. 2, 8, 12 and 13, the shaft 65 is extended laterally and provided with a spiral gear 75 meshing with a spiral gear 76 on a vertical shaft 77 which in turn carries a spur gear 78 meshing with an idler gear 79 meshing with a spur gear 80 loosely mounted on a vertical shaft 81 and whereby the gear 80 will be constantly driven by the shaft 65 during the normal operations of the machine. The gear 79 is carried by a stud shaft 82 which is adjustable in a slot 83 in a bar of a yoke 84 mounted on the main frame, whereby if desired, gears of different sizes may be substituted for the gears 78 and 79 and thus the speed of the gear 80 varied. The gear 80 carries an integral sleeve 85 having a clutch member 86 splined or feathered thereon. The clutch member 86 is operatively connected with a bifurcated rocker arm 87 and attached to a rocker shaft 88 mounted in a hanger 89 and secured to the stationary shaft 81 of the machine. The rocker shaft 88 also carries a vertically extending rocker arm 90 engaging a compression spring 91 and whereby the clutch 86 is normally held in elevated position on a sleeve 85. The rocker shaft 88 also carries a detent 92 arranged to engage one or the other of two diametrically arranged notches 93 in the upper outer edges of a rotating head 94, said detent 92 thus serving to lock said head 94 in one or the other of its different positions of rest. The rocker shaft 88 also carries another rocker arm 95 having its outer end set in the path of cam blades 96 carried by the carriages 73, said cam blades operating as the carriages pass the rocker arm 95 to elevate said rocker arm, thus rocking the shaft 88 to raise the detent 92 out of the corresponding notch 93 and thus release the head 94 for rotation. The head 94 carries a clutch member 97 co-operating with the clutch member 86, said clutch member 86 being also depressed by the elevation of the rocker arm 95 by the cam blade 96 so that when the detent 92 is arranged to release the head 94 the clutch member 86 is engaged to retain the head 94, the cam blade 96 being shaped to hold the clutch 86 in engagement with the clutch 97 until the head 94 has made substantially one-half a revolution and brought the opposite notch 93 into engagement with the detent 92 thus relocking the head 94 in position after a complete one-half revolution. The head 94 carries two radiating arms 98 secured to its underside and each carrying at its outer end a block 99 shown in detail in Figs. 10 and 11. Each of the blocks 99 carries a central pin 100 resting between two spring-held clamping jaws 101, said clamping jaws being provided with inclined or bevelled noses 102 and with rounded locking shoulders 103, said clamping jaws being normally pressed together by means of compression spring 104. The pin 100 is adapted and arranged to pass through a central opening 105 provided in a metallic laundry tag or marker 106 best shown in detail in Fig. 7.

This laundry tag or marker is provided with a penetrating pin 107 co-operating with a pivoted holder 108 held in place by a spring-held detent 109 traversing the lower portion of the opening 105 and whereby depression of the detent 109 releases the holder 108 to discharge a laundried article from the tag or marker. The specific form of tag or marker illustrated is old and well-known for the purpose, having been devised by myself for this purpose and needs no further description here. The upper portion of the laundry tag is provided with a central opening 110 provided with a laundry notch 111 and side notches 112 are also provided on opposite sides of the opening 110. These laundry tags are provided with various forms for their upper edges, some of which are illustrated in Figs. 18 to 26 inclusive. The upper edge 113 constitutes an active or operating cam edge operating in the machine to control the same. The upper edge may be provided with notches 114 and depressions 115 whereby the contour or shape or form of the upper active edge of the tag may be varied almost infinitely. Likewise the position of the notch 111 may be varied as indicated, to effect structural and functional differences between the tags.

Figure 18:
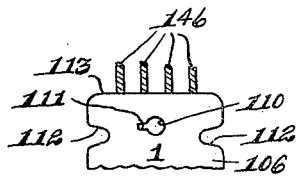
Figure 21:
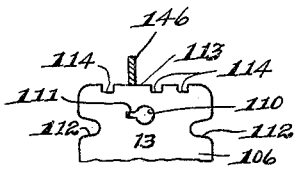
Figure 19:
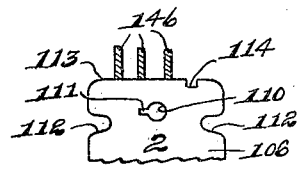
Figure 25:
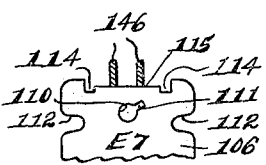
Figure 22:
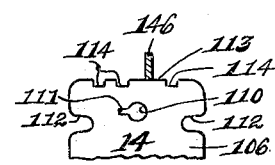
Figure 20:
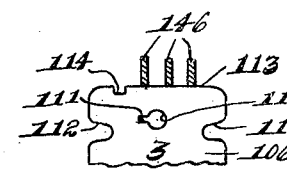
Figure 26:
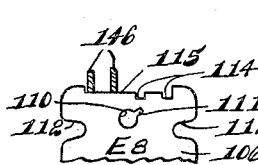
Figure 23:
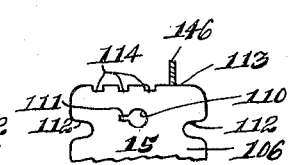
Figure 17:
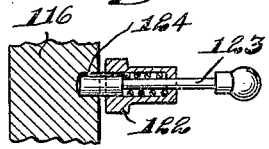
Fig. 17 is an enlarged section taken substantially on line 17—17 of Fig. 15.

An index head 116 is adjustably mounted through the bolt and slot connection 117 with the frame of the machine to occupy a position immediately above the outer position of rest of the blocks 19 when caused to revolve by cam blade 96 on the different carriages 73 as explained above. The index head 116 carries an indicator shaft 118 having a spline or key 119 adapted to fit a notch 111 in the laundry tags 106. The shaft 118 is provided with an indicator finger 120 co-operating with a lettered dial 121. The shaft 118 is adjusted by means of an arm 122 carrying a spring-held plunger 123 adapted to engage sockets 124 arranged opposite the letters on the dial 121 and whereby said shaft 118 and particularly the key 119 may be adjusted to correspond with the angular positions of the letters on the dial. Obviously when so adjusted a laundry tag 106 to be capable of being placed over the pin 100 and the shaft 118 must have its notch 111 angularly positioned the same as the feather or key 119 so that by adjusting the indicator 120 as desired only tags having correspondingly positioned notches 111 can be placed in position on pin 100 and shaft 118. The tags are furnished in groups or lots, each lot being distinguished from other lots by the position of the notch 112 so that only the tags of the particular lot to which the indicator 120 is adjusted can be placed in position on the pin 100. The tags in each lot are further separated into groups identified by the notches 114 or depressions 115 in their upper edges or by plain upper edges as indicated in Fig. 18, the tags in each such group being allotted to an individual customer of the laundry. In the usual practice in laundries the work is done in batches or lots containing the articles of about fifty customers and tags distinguished by the position of the notch 112 are provided for each of such batches or lots. Thus for example, the tags for all of the articles in the batch or lot termed "D" would be provided with notches 111 arranged as indicated in Fig. 24 which, as will be noted, corresponds with the position of the letter "D" on the dial 116, so that when the indicator 120 is adjusted to point to the letter "D" on the dial 116, only tags having notches positioned as in Fig. 24 can be placed in position on pin 100, other tags not being capable of passing over shaft 118. In this way confusion of the various batches or lots of laundry is avoided and should an article from another batch or lot become accidently misplaced, it will be at once detected by the operator of the machine due to the fact that the tag on such article cannot be placed over the shaft 118. As indicated in Fig. 18 the upper edges 113 of some of the tags are left blank. That is, without even depressions 115 or notches 114, it being possible and feasible to distinguish one group or lot in this manner and such a method of distinguishing has also been provided for on the dial 116 as shown.

Figure 16:
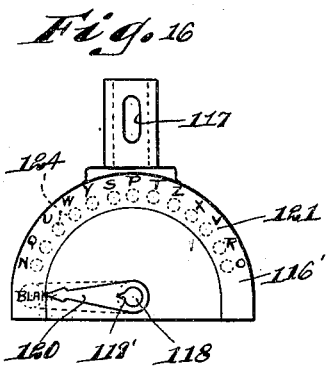
Fig. 16 is a detail view of another and similar index plate employed in conjunction with the machine.

The diversity of tags and particularly of groups or batches of tags may be further augmented by slightly changing the character of the indicating dial. Such arrangement has been indicated in Fig. 16 where the indicator dial 116' is provided with a shaft 118 having a different form of feather or spline 119', it being intended that the notches 111 in the laundry tags be shaped to correspond. It is apparent that various other forms and configurations of the notch 111 and the opening 110 could be resorted to further distinguish the tags and permit of the employment of a larger variety of groups or batches without danger of confusion.

In operating the machine the operator places the tags 106, each carrying a laundried article, successively on the pin 100 and shaft 118 when one of the blocks 99 is located in its outermost position directly under the indicator 116, pressing the tag rearwardly to cause separation of the spring clamping jaws 101 due to the action of the bevelled surfaces 102 and causing the tag to be engaged behind the rounded shoulders 103 thus temporarily locking the tag in position on the block 99. Immediately thereafter the cam blade 96 on one of the carriages 73 engages the rocker arm 95 and causes rotation of the head 94 and blocks 99 through a half revolution, thus causing the block 99 carrying said tag and laundried article to assume position on the opposite side of the shaft 81 and with the upper portion of the tag in the path of the next succeeding carriage 73. As best shown in Fig. 6 each of the carriages 73 is provided with a central forward recess 125 of a size to receive the upper portion of said tag. Spring clamping jaws 126 are arranged on each carriage and normally pressed toward each other by the springs 127, said clamping jaws being positioned to pass into the notches 112 in the tag as the carriage moves rearwardly. The clamping jaws 126 yield outwardly to permit the passage of the tag between them, being provided with inclined surfaces 128 for this purpose. When the upper portion of said tag thus passes into the forward end of the recess 125 it passes into notches 129 provided for holding the same against an abutment 106' arranged at the end of the recess, said abutment serving to exert sufficient force on the tag to force it from between the spring jaws 101 of the head 99, the rounded shoulders 103 of the clamping jaws 101 causing said jaws 101 to yield outwardly to release the tag. Thus said tag and the laundried articles supported thereby is removed from the head 99 and transferred to the corresponding carriage 73. To facilitate the accurate positioning of the tag on the carriage, inclined guide surfaces 126' are arranged on the carriage to contact with the upper side portions of the tag thus guiding said tag to central position as will be readily understood and insuring the carrying of the tags always in the same position by the carriage. Each carriage is provided with grooves 130, best shown in Fig. 9 arranged and adapted to engage over the edges of a lower guide track or bar 131 supported on brackets 132 in the lower rearward path of the carriages 73. An upper track or guideway 133 is also provided to guide the forward inverted movements of the carriages 73. By this arrangement the accurate rearward travel of the carriages 73 is insured to insure accurate engagement and removal of the tags from the blocks 99.

As best shown in Fig. 9 a signal flap 134 of leather or the like is mounted on the end of a bent lever 135 to rest normally immediately above the pin 100 and shaft 118 when in position to receive the laundry tags as above explained. The lever 135 is pivoted at 136 on a part of the bracket 84 and a tension spring 137 normally holds said lever with flap 134 elevated. The inner end 135' of the lever 135 is set in the path of the cam blade 96 on the carriages 73 and the arrangement is such that just before the cam-blade 96 strikes the rocker arm 95 the inner end of the lever 135 is elevated to depress the flap 134 downwardly in front of the pin 100 and shaft 118, thus serving as a warning to the operator that the head 99 is about to swing and giving the operator time to avoid injury therefrom.

As best shown in Figs. 4, 5 and 43, laterally extending hangers 138 are extended from the hangers 132 and support sectional plates or bars 139 in parallel relation with the lower track 131, said bars 139 being detachably secured to the hangers 138 so as to permit of ready removal and replacement when desired, one of said removable bars or plates 139 being provided for each discharge station of the machine. Three of these discharge stations are illustrated in the drawings as they are all substantially identical with each other but it is to be understood that a completed machine for practical use in a laundry of considerable size will contain a large number of these discharge stations, usually about fifty.

As best shown in Figs. 2, 4, 30 and 35, each of the plates 139 has associated with it a corresponding guide block 140 mounted centrally on top of track 131 opposite the central portion of each plate 139. Each guide block 140 carries a vertically reciprocating plunger 141 having a spring cushioned plug 142 in its upper end contacting with the underside of the track 133, as best shown in Fig. 37.

As best shown in Fig. 38 each plunger 141 is rectangular in cross section and is provided with four cylindrical parallel tumbler sockets 143 adapted and arranged to contain four cylindrical plungers or tumblers 144 resting against corresponding compression springs 144'. Each guide block 140 is provided with registering openings adapted to contain corresponding cylindrical tumbler blocks 145 and the tumbler blocks 145 contact with operating leaves or blades 146 pivoted at 147 and provided with cam surfaces 148 extending through slots 149 in the track 131. As will be observed this arrangement constitutes a tumbler lock arrangement for holding each plunger 141 in elevated position. As long as the tumbler blocks 144 cross the dividing line between the plunger 141 and the guide block 140 the plunger 141 is locked against depression. However, as soon as the blades 146 are elevated sufficiently to cause the meeting lines between the blocks 145 and the blocks 144 to register with the dividing line between the plunger 141 and the guide block 140, the plunger 141 is released and will be forced downwardly by the spring plug 142. This constitutes a combination lock mechanism for holding the plungers 141 in elevated positions operable by the leaves 146. It will be noted that when the leaves 146 are elevated proper distances, the lock will be released and thus the plunger 141 released for downward movement. A bevelled recess 150 is provided in plunger 141 above each of the sockets 143 and a registering recess 151 is provided in guide block 140 opposite each recess 150, said recesses facilitating the operation of the plungers as above described. If one of the tumblers 145 is thrown a little too far to the rear nevertheless the plunger 141 will operate and the bevelled portion of recess 150 will force the tumbler 145 back to proper position as the plunger descends. Likewise the recess 151 tends to release the binding on the tumblers and permit slight inaccuracy of the parts. Each plunger 141 is provided at its lower end with a cylindrical cam block or head 152 projecting through a corresponding opening in the track 131 so that when the plunger descends the cam head 152 is projected downwardly into the path of the carriages 73. The cam surfaces 148 on the leaves 146 project downwardly through the track 131 into the path of the upper edge of a tag 106 carried by the carriage so as to be contacted by said edge of said tag. Obviously if the upper edge of the tag is given the proper shape or configuration it will elevate the leaves 146 properly to bring the tumbler blocks 145 and 144 in proper positions to release the plunger 141, but unless the tag bears such proper configuration this releasing action cannot take place. Obviously also the tumbler blocks may be omitted from behind all but one of the leaves 146 or any combination of said leaves so that a wide variety of locking and releasing arrangements may thus be provided by omitting certain of the tumbler blocks. Obviously also the tumblers may be made of different lengths and thus caused to register in different relative positions of the leaves 146 thus further augmenting the possible number of variable combinations which may be provided for locking the plungers. Where the tumbler blocks are omitted of course the leaves 146 may also be omitted from the machine and the arrangement illustrated in Fig. 38 indicates the tumbler blocks omitted from one set of tumbler sockets and the corresponding leaf 146 also omitted. The notches 114 provided in the upper edges of the tags 106 are arranged to register with leaves 146 so that the leaves 146 pass through said notches when present and are thus not elevated or operated by the corresponding tag. Thus a certain tag or group of tags may be readily formed to pass any or all sets of the leaves 146 without operating the corresponding plunger by simply providing one or more of the notches 114 to receive one or more of the leaves 146 and thus fail to operate said leaves. In the form of tag illustrated in Fig. 18 the tag is not provided with any of the notches 114 and therefore will elevate all of the leaves 146. For this reason this form of tag is arranged to be used to operate the first discharge plunger only said first discharge plunger being equipped with four of the leaves 146 and requiring elevation of all four leaves to release it. The form of tag illustrated in Fig. 19 contains one notch 114 arranged as shown and this tag will only operate the plunger equipped with three of the leaves 146 arranged as indicated, obviously any plunger equipped with a leaf 146 corresponding with the notch 114 will not be operated by this tag. So also with each of the other configurations illustrated in Figs. 20 to 26 inclusive. Each of these arrangements will operate one plunger with operative leaves 146 arranged as indicated but will not operate any arrangement of leaves where one or more leaves passes through a notch. It is thus apparent that by this arrangement each customer of a laundry may be provided with a sufficient number of tags having a distinctive configuration as far as the presence, location, depth and so forth of the notches 114 are concerned as to be capable of operating one of the plungers 141 and one only of said plungers. In the practical operation of the machine this feature and peculiarity is availed of to cause removal of the tags carrying the laundried articles of any particular customer at the station assigned to that customer by causing the fall of the corresponding cam block 152.

As best shown in Figs. 4, 30, and 43 each plunger 141 carries a laterally extending bracket 152 overhanging the track 139 and provided with a notch 154 in its bottom to permit the passage of the carriages 73 when depressed. Each bracket 153 carries a laterally extending depending operating finger or arm 155 set to contact with a spring detent 156 having a notch 157 engaging a pin 158 on an oscillatory arm 159 carried by an oscillatory shaft 160, best shown in Fig. 45. The shaft 160 is mounted in a block 161 and carries a pinion 162 meshing with a rackbar 162' contacting with a plunger 163 operable by a spring 164 best shown in Fig. 44. The arm 159 carries the pin 165 at its free end and is also provided with a stop lug 165' adapted to strike the lower end of the cam plunger 152 when the arm 159 swings upwardly positioning the pin 165 in registration with the opening 105 in a tag 106 carried by the carriage. It will thus be seen that when the arm 159 is released by the downward movement of the plunger 141, the pin 165 swings upwardly into registration with the opening 105 so that the tag carried by the carriage 73 which caused the drop of the plunger will be threaded by the carriage upon the pin 165. At the same time the cam plunger 152 passes between cam surfaces 166 on clamping jaws 126 as best shown in Fig. 28, spreading said jaws apart to release the tag which has thus been threaded upon the pin 165.

As best shown in Figs. 5 and 28 each carriage 73 carries at its left side a vertically swinging springheld cam lever 167 provided with an enlarged circular opening engaging a stop pin 167' thus limiting the vertical swing of said cam lever. The upper inclined surface 168 of said cam lever is set in the path of a shoulder 169 on the bottom of block 153 best shown in Fig. 30 so that when said shoulder 169 is depressed, the cam lever will be depressed thereby as the carriage passes thereunder. This depression of the cam lever 167 causes the lateral flange 168' on said cam lever to pass under a stop shoulder 170 on a block 171 secured to the plate 139, said shoulder 170 thus serving to hold the cam lever 167 in depressed position until the flange 168' passes from under the shoulder 170 for a purpose to be presently explained. The plunger 141 carries two laterally extending pins 172 arranged to be engaged by the cam blades 96 and 96' on carriage 73, said cam blades serving to elevate the plunger 141 and reset the same for future operation. As best shown in Fig. 28 each carriage 73 also carries a laterally extending cam blade 173 having a laterally inclined cam surface 174 set in the path of the end of the rackbar 162' and whereby said rackbar is forced outwardly by the passage of the carriage. This outward forcing of the rackbar rotates the arm 159 to withdraw the pin 165 now carrying the released laundry tag 106 and restores said pin to original position. As best shown in Fig. 45 the notch 157 in the detent 156 is provided with a rounded cam surface 175 operating on the pin 158 to further retract the rackbar 162' to effect good clearance as the notch 157 reengages with the pin 158, the spring of the detent 156 being made strong enough for this purpose.

As best shown in Fig. 28 a rocker arm 177 is set in the path of the rounded shoulder 178 of the flange 169 when depressed as explained above, said shoulder 178 being arranged to contact with rounded rough surface 179 of said rocker arm. The rocker arm 177 is rigidly connected with a pinion 180 meshing with a pinion 182 provided with a rocker shaft 183 secured by pin 184 to the block 161 carrying the arm 159 as explained above and as best illustrated in Fig. 29, and whereby when the rocker arm 177 is rocked by the action of the shoulder 178 the block 161 will be oscillated to carry the pin 165 carrying the released tag 106 into registration with the end of a guide rod 185 as indicated by the dotted lines in Fig. 28. Stop pins 186 and 187 are provided to limit the swing of the block 161 to effect such registration and the ends of the pin 165 and the rod 185 are bevelled as shown to permit of the ready passage of the released tag onto the guide rod 185. Obviously the registration will be maintained until the cam lever 167 has passed the rocker arm 177.

As best shown in Figs. 29, 30, 33, 39 and 40, the rocker shaft 183 carries a rocker arm 188 connected with an operating link 189 which in turn is connected with an arm 190 pivoted at 191 on a clutch shift lever 192 pivoted at 193 on a rod 194 of the frame of the machine. A tension spring 190' connected with the arm 190 and the rod 189 serves to maintain the parts in positions shown and return said parts to said positions. The arm 190 carries a stop lug 195 set in the path of the bracket 196 carried by a sprocket chain 197. A clutch member 198 is splined on the shaft 199 and provided with a compression spring 200 arranged to press said clutch member toward engagement with a co-operating clutch member 201 on the sprocket wheel 202 for sprocket chain 197. The clutch member 198 is operatively connected with the lever 192 and is normally held from engagement with the clutch member 201 by the interaction of the lug 195 and the shoe 196 as indicated in Fig. 40. Obviously, however, when the lug 195 is withdrawn from contact with the shoe 196 the clutch member 198 will engage with the clutch member 201 under the influence of the spring 200. Thus when the rocker arm 188 is operated by the pinion 182 as explained above the clutch members will be thrown into engagement with each other.

As best shown in Figs. 33 and 41 the shaft 199 carries a spiral gear 203 meshing with a spiral gear 204 on a shaft 205 connected by universal joint 206 with shaft 207 which in turn is connected by universal joint 208 with the shaft 57 and whereby shaft 199 is constantly driven. Thus when the clutch members 198 and 201 engage the sprocket chain 197 will be caused to move.

As best shown in Figs. 28, 30, 31 and 32 the sprocket chain 197 carries a bifurcated arm 209 arranged to pass around the sprocket wheel 197', straddle the pin 165 and the rod 185 and carry the released tag onto the rod 185, the slot 210 in the arm 209 passing over said pin and rod. The arm 209 is provided with laterally extending guide lugs 211 adapted to run in guide channels 212 to guide the travel of said arm along the rod 185. The end of rod 185 rests in a slot 213 in an arm 214 mounted on a sleeve 215 loose on a stud shaft 216. A torsional spring 217 is connected with the arm 214 as shown to hold said arm in engagement with said rod. The sleeve 215 also carries a companion slotted arm 218 set at an angle to the arm 214 and resting against a stop bar 219, the arrangement being such that as the tag passes onto the rod 185 the arm 214 will yield to permit the passage of the arm 209 and said tag but as the arm 214 yields the arm 218 will come into engagement with the rod 185 behind the tag thus supporting the rod 185 but permitting the passage of the tag and the arm 209. Similar rocker arms 220 are arranged on a sleeve 221 on a stud shaft 222 and held by torsional spring 223 against a stop 224 said arms 220 being arranged to interfit with the slots in the arms 214 and 218 during the above action to hold the rod 185 in said slots as will be readily understood and whereby the end of the rod 185 will be supported but the passage of the tag onto said rod permitted. As best shown in Figs. 33 and 34 the rod 185 is provided on its bottom with a cam blade 225 which contacts with the detent 109 of a tag 106 being pushed along said rod by the arm 209, said cam blade depressing said detent to release the holder 108 and discharge the laundried article carried by the tag. After this discharge of the laundried article from the tag the tag is further pushed along the rod 185 until it passes beyond the range of movement of the arm 209, the tags thus freed from the laundried articles being collected at the outer end of said rod.

As best shown in Figs. 33, 39 and 40, an abutment 226 is mounted on a bracket 226' secured to the frame rod 194 said abutment being positioned opposite the lug 195 on the arm 190 and so that when the stop bracket 196 on chain 197 again arrives opposite the lug 195 the abutment 226 will guide the travel of said stop bracket 196. As best shown in Fig. 40 the stop bracket 196 is provided with a bevelled forward edge 227 and a stop shoulder 228, the bevelled edge 227 engaging the lug 195 and operating as a wedge or cam surface to force the clutch 198 out of engagement with the clutch 201 thus stopping the motion of the chain 197 after the deposit of the removed tag on the outer end of the rod 185 as above explained. Under such action as soon as the clutch 198 cleared the clutch 201 the chain 197 would stop and this might leave the clutch 198 so close to the clutch 201 as to cause accidental engagement. To prevent this I provide a friction plate 229 splined upon the shaft 199 and pressed into frictional engagement with the sprocket 202 by means of an adjustable compression spring 230 said friction plate causing sufficient drive of the sprocket 197 to cause complete travel of the lug 195 up the inclined surface 227 until the stop shoulder 228 is positively engaged. This will cause the clutch 198 to clear completely from the clutch 201 and also will stop the chain 197 and other parts including the arm 209 at the same position after each operation. The outer end of the rod 185 is removably supported in a socket 231 being held in place therein by means of a spring detent 232 as shown, and whereby after the laundry tags of any particular customer have all been collected on the outer end of the rod 185 they may be readily removed.

A suitable bin is provided under the rods 185 the same being divided into a plurality of compartments 233 best shown in Fig. 2, and whereby the laundried articles freed from the tags of any one customer will be deposited in the compartment under the corresponding rod 185.

As best shown in Figs. 3 I provide a general discharge plunger 234 at the extreme rear end of the track 131 said discharge plunger normally protruding below said track and being gravity-held but equipped with the side pins 172 for elevation by the cam blades 96 and 96' to permit the passage of the carriages 73. By this arrangement should the tag fail to discharge from one of the carriages for any reason the plunger 234 will discharge said tag and thus prevent the same or an article carried thereby from becoming entangled in the machine.

In practice the machine is provided with as many of the stations as it is desired to handle the laundry of that many customers in one batch or lot, usually fifty. A suitable number of tags are provided for each customer, the tags for each customer being provided with a distinct configuration at their upper edge so as to operate but one of the plungers 141 as explained above. Likewise the tags alloted to the different customers constituting such a group all have the same arrangement of the notch 111. When such a batch of laundry has been laundried the same is brought to the operator of the machine with the goods of the various customers commingled. The operator takes up each laundried article by its tag and places the tag on the pin 99 and the shaft 118 singly and just as they come to her. The machine automatically takes care of the tags and laundried articles, depositing the articles of each customer in the respective compartment alloted to that customer and arranging and collecting the tags on the corresponding rod 185. When a new batch of laundry arrives at the machine the indicator is set to adjust the shaft 118 to fit the notch 111 corresponding to the new batch whereupon the machine will assort the articles and tags as explained above. Obviously more or less of the discharge stations may be provided as desired and arrangements made to take care of a larger or smaller variety of batches of laundry as desired.

For wet wash laundry all articles for one customer of the same color are usually placed in a net bag so that each customer would ordinarily only have a limited number of such bags alloted to him. In such case the individual assorting of the different articles is not desired or necessary. Each bag is identified by a tag allotted to the customer and the individual discharge stations for the machine are disconnected and removed. The tags carrying the net bags are placed on the machine as before but are merely discharged on the floor under the track 131.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A sorting machine comprising a constantly moving conveyor; an intermittently moving conveyor associated therewith and arranged to receive laundry articles at a point remote from said continuously moving conveyor and transfer said laundry articles to the same; and selective means including a shiftable cam block operated by said moving laundry articles for discharging them from said continuously operating conveyor, substantially as described.

2. A sorting machine comprising a constantly moving conveyor; an intermittently moving conveyor associated therewith and arranged to receive laundry articles at a point remote from said continuously moving conveyor and transfer said laundry articles to the same; and selective means including a cam block, positioned along said continuously operating conveyor operated by the carried laundry articles for discharging the same, substantially as described.

3. A sorting machine comprising a conveyor in the form of a continuously traveling endless belt; a carriage on said conveyor; means on said carriage for carrying laundry articles to be sorted; an intermittently operating conveyor arranged to receive laundry articles at a point remote from and transfer said laundry articles to said continuously operating conveyor; and selective means including a shiftable cam block, operated by said moving laundry articles for discharging the same, substantially as described.

4. A sorting machine comprising a conveyor in the form of a continuously traveling endless belt; a carriage on said conveyor; means on said carriage for carrying laundry articles to be sorted; an intermittently operating conveyor arranged to receive laundry articles at a point remote from and transfer said laundry articles to said continuously operating conveyor; and selective means including a cam block, positioned along said continuously operating conveyor operated by the carried laundry articles for discharging the same, substantially as described.

5. A sorting machine comprising a conveyor; a carriage on said conveyor; spring clamping jaws on said carriage; means for receiving articles to be sorted and transferring said articles to said clamping jaws; a shiftable cam block arranged to be shifted into position to spread said clamping jaws and to release an article carried thereby; and means operable by an article carried by said jaws for shifting said cam block, substantially as described.

6. A sorting machine comprising a conveyor; a carriage on said conveyor; spring clamping jaws on said carriage; a shiftable cam block arranged to be shifted into position to spread said clamping jaws to release an article carried thereby; means operable by an article carried by said jaws for shifting said cam block; and means carried by said carriage for shifting said cam block into inoperative position, substantially as described.

7. A sorting machine comprising a conveyor; a carriage on said conveyor; spring clamping jaws on said carriage; means for receiving articles to be sorted and transferring said articles to said clamping jaws; a shiftable cam block arranged to be shifted into position to spread said clamping jaws and to release an article carried thereby; means operable by an article carried by said jaws for shifting said cam block; and means carried by said carriage for shifting said cam block into inoperative position, substantially as described.

8. A sorting machine comprising a main conveyor, means on said conveyor, including a carriage having clamping jaws releasably retaining laundry articles to be sorted, said clamping jaws being operated by a shiftable cam block co-acting therewith, selective means positioned at various points along said conveyor operated by the carried articles for discharging the same; and transverse conveyors located at said discharge points to receive articles so released from said main conveyor and transport them laterally and there deposit them, substantially as described.

9. A sorting machine comprising a main conveyor, means on said conveyor, including a carriage having clamping jaws releasably retaining laundry articles to be sorted, said clamping jaws being operated by a shiftable cam block co-acting therewith, selective means positioned at various points along said conveyor operated by the carried articles for discharging the same; and transverse conveyors arranged at said discharge points for receiving such discharged articles and transporting them laterally and there depositing them, substantially as described.

10. A sorting machine comprising a conveyor; a carriage on said conveyor; spring clamping jaws on said carriage; a shiftable cam block arranged to be shifted into position to spread said clamping jaws to release an article carried thereby; means operable by an article carried by said jaws for shifting said cam block; and means for receiving an article released from said carriage and transporting it laterally from said conveyor and there depositing it, substantially as described.

11. A sorting machine comprising a conveyor; a carriage on said conveyor; spring clamping jaws on said carriage; means for receiving articles to be sorted and transferring said articles to said clamping jaws; a shiftable cam block arranged to be shifted into position to spread said clamping jaws to release an article carried thereby; means operable by an article carried by said jaws for shifting said cam block; and means for receiving an article released from said carriage and transporting it laterally from said conveyor and there depositing it, substantially as described.

12. A sorting machine comprising a conveyor; a carriage on said conveyor; spring clamping jaws on said carriage; a shiftable cam block arranged to be shifted into position to spread said clamping jaws to release an article carried thereby; means operable by an article carried by said jaws for shifting said cam block; means carried by said carriage for shifting said cam block into inoperative position; and means for receiving an article released from said carriage and transporting it laterally from said conveyor and there depositing it, substantially as described.

13. A sorting machine comprising a conveyor; a carriage on said conveyor; spring clamping jaws on said carriage; means for receiving articles to be sorted and transferring said articles to said clamping jaws; a shiftable cam block arranged to be shifted into position to spread said clamping jaws to release an article carried thereby; means operable by an article carried by said jaws for shifting said cam block; means carried by said carriage for shifting said cam block into inoperative position; and means for receiving an article released from said carriage and transporting it laterally from said conveyor and there depositing it, substantially as described.

14. A sorting machine comprising a conveyor; a carriage on said conveyor; means on said carriage for carrying laundry tags to be sorted; selective means positioned along said conveyor operated by the carried tags for discharging the same from said carriage; means for receiving a tag released from said carriage and transporting it laterally from said conveyor and there depositing it; and means located along the path of lateral transportation for opening laundry tags so transported and discharging laundried articles therefrom, substantially as described.

15. A sorting machine comprising a conveyor; a carriage on said conveyor; means on said carriage for carrying laundry tags to be sorted; means for receiving tags to be sorted and transferring said tags to said carriage; selective means positioned along said conveyor operated by the carried tags for discharging the same from said carriage; means for receiving a tag released from said carriage and transporting it laterally from said conveyor and there depositing it; and means located along the path of lateral transportation for opening laundry tags so transported and discharging laundried articles therefrom, substantially as described.

16. A sorting machine comprising a conveyor; a carriage on said conveyor; spring clamping jaws on said carriage; a shiftable cam block arranged to be shifted into position to spread said clamping jaws to release a laundry tag carried thereby; means operable by a tag carried by said jaws for shifting said cam block; means for receiving a tag released from said carriage and transporting it laterally from said conveyor and there depositing it; and means located along the path of lateral transportation for opening laundry tags so transported and discharging laundried articles therefrom, substantially as described.

17. A sorting machine comprising a conveyor; a carriage on said conveyor; spring clamping jaws on said carriage; means for receiving laundry tags to be sorted and transferring said tags to said clamping jaws; a shiftable cam block arranged to be shifted into position to spread said clamping jaws and to release a tag carried thereby; means operable by a tag carried by said jaws for shifting said cam block; means for receiving a tag released from said carriage and transporting it laterally from said conveyor and there depositing it; and means located along the path of lateral transportation for opening laundry tags so transported and discharging laundried articles therefrom, substantially as described.

18. A sorting machine comprising a conveyor; a carriage on said conveyor; spring clamping jaws on said carriage; a shiftable cam block arranged to be shifted into position to spread said clamping jaws to release a laundry tag carried thereby; means operable by a tag carried by said jaws for shifting said cam block; means carried by said carriage for shifting said cam block into inoperative position; means for receiving a tag released from said carriage and transporting it laterally from said conveyor and there depositing it; and means located along the path of lateral transportation for opening laundry tags so transported and discharging laundried articles therefrom, substantially as described.

19. A sorting machine comprising a conveyor, a carriage on said conveyor; spring clamping jaws on said carriage; means for receiving laundry tags to be sorted and transferring said tags to said clamping jaws; a shiftable cam block arranged to be shifted into position to spread said clamping jaws to release a tag carried thereby; means operable by a tag carried by said jaws for shifting said cam block; means carried by said carriage for shifting said cam block into inoperative position; means for receiving a tag released from said carriage and transporting it laterally from said conveyor and there depositing it; and means located along the path of lateral transportation for opening laundry tags so transported and discharging laundried articles therefrom, substantially as described.

20. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; and swinging leaves arranged to set said tumblers to release said cam block, said leaves projecting through slots in said track to engage an article carried by said jaws, substantially as described.

21. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; and means for receiving articles to be sorted and transferring said articles to said carriage to be engaged by said clamping jaws, substantially as described.

22. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; and means carried by said carriage for shifting said cam block back to inoperative position, substantially as described.

23. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; means for receiving articles to be sorted and transferring said articles to said carriage to be engaged by said clamping jaws; and means carried by said carriage for shifting said cam block back to inoperative position, substantially as described.

24. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; and means for receiving an article released from said carriage and transporting it laterally from said conveyor and there depositing it, substantially as described.

25. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; means for receiving articles to be sorted and transferring said articles to said carriage to be engaged by said clamping jaws; and means for receiving an article released from said carriage and transporting it laterally from said conveyor and there depositing it, substantially as described.

26. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release a laundry tag carried thereby; tumblers locking said cam block in inoperative position; swinging leaves arranged to set said tumblers to release said cam block, said leaves projecting through slots in said track to engage a tag carried by said jaws; means for receiving a tag released from said carriage and transporting it laterally from said conveyor and there depositing it; and means located along the path of lateral transportation for opening laundry tags so transported and discharging laundried articles therefrom, substantially as described.

27. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release a laundry tag carried thereby; tumblers locking said cam block in inoperative position; swinging leaves arranged to set said tumblers to release said cam block, said leaves projecting through slots in said track to engage a tag carried by said jaws; means for receiving tags to be sorted and transferring said tags to said carriage to be engaged by said clamping jaws; means for receiving a tag released from said carriage and transporting it laterally from said conveyor and there depositing it; and means located along the path of lateral transportation for opening laundry tags so transported and discharging laundried articles therefrom, substantially as described.

28. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release a laundry tag carried thereby; tumblers locking said cam block in inoperative position; swinging leaves arranged to set said tumblers to release said cam block, said leaves projecting through slots in said track to engage a tag carried by said jaws; means carried by said carriage for shifting said cam block back to inoperative position; means for receiving tags to be sorted and transferring said tags to said carriage to be engaged by said clamping jaws; and means located along the path of lateral transportation for opening laundry tags so transported and discharging laundried articles therefrom, substantially as described.

29. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release a laundry tag carried thereby; tumblers locking said cam block in inoperative position; swinging leaves arranged to set said tumblers to release said cam block, said leaves projecting through slots in said track to engage a tag carried by said jaws; a swinging finger arranged to be set in the path of a tag in said clamping jaws and automatic means for operating the same; a guide rod and automatic means for bringing said finger into registration therewith; an endless conveyor arranged to carry tags along said guide rod; and a cam blade on said guide rod for opening laundry tags sliding thereon, substantially as described.

30. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; a swinging finger arranged to be set in the path of an article in said clamping jaws and automatic means for operating the same; a guide rod and automatic means for bringing said finger into registration therewith; an endless conveyor arranged to carry articles along said guide rod; a cam blade on said guide rod for opening laundry articles sliding thereon; and means for receiving articles to be sorted and transferring said articles to said carriage to be engaged by said clamping jaws, substantially as described.

31. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; a swinging finger arranged to be set in the path of an article in said clamping jaws and automatic means for operating the same; a guide rod and automatic means for bringing said finger into registration therewith; an endless conveyor arranged to carry articles along said guide rod; a cam blade on said guide rod for opening laundry articles sliding thereon; and means carried by said carriage for shifting said cam block into inoperative position, substantially as described.

32. A sorting machine comprising a track; an endless flexible conveyor travelling along said track; a carriage attached to said conveyor and running on said track; spring clamping jaws on said carriage; a shiftable cam block carried by said track and shiftable into and out of the path of said jaws to spread said jaws to release an article carried thereby; tumblers locking said cam block in inoperative position; swinging leaves arranged to set said tumblers to release said cam block, said leaves projecting through slots in said track to engage an article carried by said jaws; a swinging finger arranged to be set in the path of an article in said clamping jaws and automatic means for operating the same; a guide rod and automatic means for bringing said finger into registration therewith; an endless conveyor arranged to carry articles along said guide rod; a camblade on said guide rod for opening laundry articles sliding thereon; means for receiving articles to be sorted and transferring said articles to said carriage to be engaged by said clamping jaws; and means carried by said carriage for shifting said cam block back into inoperative position, substantially as described.

33. A machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam block when said leaves are swung upwardly, said leaves projecting downwardly through slots in said track to engage an article carried by said jaws; and metallic laundry articles arranged to be carried by said jaws and provided on their upper edges wih notches to fit said leaves, substantially as described.

34. A machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam block when said leaves are swung upwardly, said leaves projecting downwardly through slots in said track to engage an article carried by said jaws; metallic laundry tags arranged to be carried by said jaws and provided on their upper edges with notches to fit said leaves; and means for receiving said laundry articles and transferring said articles to said carriage to be engaged by said clamping jaws, substantially as described.

35. A sorting machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam blocks when said leaves are swung upwardly, said leaves projecting downwardly through slots in said track to engage an article carried by said jaws; metallic laundry articles arranged to be carried by said jaws and provided on their upper edges with notches to fit said leaves; and cam blades carried by said carriage arranged to engage said cam block when depressed and elevate it into inoperative position, substantially as described.

36. A sorting machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam block when said leaves are swung upwardly, said leaves projecting downwardly through slots in said track to engage an article carried by said jaws; metallic laundry articles arranged to be carried by said jaws and provided on their upper edges with notches to fit said leaves; means for receiving said laundry articles and transferring said articles to said carriage to be engaged by said clamping jaws; and cam blades carried by said carriage arranged to engage said cam block when depressed and elevate it into inoperative position, substantially as described.

37. A machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam block when said leaves are swung upwardly, said leaves projecting downwardly through slots in said track to engage an article carried by said jaws; metallic laundry articles arranged to be carried by said jaws and provided on their upper edges with notches to fit said leaves; and a cam block at the operative end of said track arranged to rest normally in the path of said clamping jaws and operate the same to release any article then carried thereby, substantially as described.

38. A machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam block when said leaves are swung uywardly, said leaves projecting downwardly through slots in said track to engage an article carried by said jaws; metallic laundry articles arranged to be carried by said jaws and provided on their upper edges with notches to fit said leaves; means for receiving said laundry articles and transferring said tags to said carriage to be engaged by said clamping jaws; and a cam block at the operative end of said track arranged to rest normally in the path of said clamping jaws and operate the same to release any article then carried thereby, substantially as described.

39. A sorting machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam block when said leaves are swung upwardly, said leaves projecting downwardly through slots in said track to engage an article carried by said jaws; metallic laundry articles arranged to be carried by said jaws and provided on their upper edges with notches to fit said leaves; cam blades carried by said carriage arranged to engage said cam block when depressed and elevate it into inoperative position; and a cam block at the operative end of said track arranged to rest normally in the path of said clamping jaws and operate the same to release any article then carried thereby, substantially as described.

40. A sorting machine comprising a track; an endless flexible conveyor travelling along said track; a carriage attached to said conveyor and running on said track; spring clamping jaws on said carriage; a vertically shiftable cam block carried by said track and shiftable to project downwardly from said track into the path of said jaws to spread said jaws to release an article carried thereby; tumblers locking said cam block in its elevated position; vertically swinging leaves arranged to set said tumblers to release said cam block when said leaves are swung upwardly, said leaves projecting downwardly through slots in said track to engage an article carried by said jaws; metallic laundry articles arranged to be carried by said jaws and provided on their upper edges with notches to fit said leaves; means for receiving said laundry articles and transferring said articles to said carriage to be engaged by said clamping jaws; cam blades carried by said carriage arranged to engage said cam block when depressed and elevate it into inoperative position; and a cam block at the operative end of said track arranged to rest normally in the path of said clamping jaws and operate the same to release any article then carried thereby, substantially as described.

41. A sorting machine comprising horizontally extending track; a flexible endless conveyor mounted in operative relation with said track, the lower portion of said conveyor being arranged to travel adjacent the underside of said track; a plurality of carriages mounted on said conveyor and grooved to travel against the underside of said track; a pair of springheld clamping jaws on each of said carriages arranged to travel adjacent the underside of said track; a plurality of plunger casings mounted on said track; a springheld plunger in each of said casings arranged to be depressed and the lower end projected from the bottom of said track, the lower end of each plunger being formed into a cam block arranged to spread said clamping jaws, there being a plurality of registering openings and recesses in each of said plungers and its casing; springheld tumbler blocks in said recesses and openings arranged to lock said plunger in elevated position but to release said plunger when properly adjusted; and a plurality of vertically swinging leaves mounted on each casing and co-operating with said tumbler blocks to operate the same, said leaves projecting downwardly through slots in said track and into the path of articles carried by said clamping jaws, substantially as described.

42. A sorting machine comprising horizontally extending track; a flexible endless conveyor mounted in operative relation with said track, the lower portion of said conveyor being arranged to travel adjacent the underside of said track; a plurality of carriages mounted on said conveyor and grooved to travel against the underside of said track; a pair of springheld clamping jaws on each of said carriages arranged to travel adjacent the underside of said track; a plurality of plunger casings mounted on said track; a springheld plunger in each of said casings arranged to be depressed and the lower end projected from the bottom of said track, the lower end of each plunger being formed into a cam block arranged to spread said clamping jaws, there being a plurality of registering openings and recesses in each of said plungers and its casing; springheld tumbler blocks in said recesses and openings arranged to lock said plunger in elevated position but to release said plunger when properly adjusted; a plurality of vertically swinging leaves mounted on each casing and co-operating with said tumbler blocks to operate the same; said leaves projecting downwardly through slots in said track and into the path of laundry tags carried by said clamping jaws; a swinging arm carrying a pin arranged to register with tags carried by said clamping jaws and associated with each of said plungers; means operable by each of said plungers for operating said arm to swing said pin into registration with said clamping jaws; a guide rod associated with said arm and arranged to register with said pin when swung into a different position; means operable by said carriage for swinging said pin into registration with said guide rod; an endless flexible conveyor co-operating with said pin and guide rod and arranged to move tags from said pin onto and along said guide rod; means operable by said carriage for operating said last-named endless conveyor; and a cam-blade on said guide rod arranged to open laundry tags moving along said guide rod, substantially as described.

43. A sorting machine comprising a horizontally extending track; a flexible endless conveyor mounted in operative relation with said track, the lower portion of said conveyor being arranged to travel adjacent the underside of said tracks; a plurality of carriages mounted on said conveyor and grooved to travel against the underside of said track; a pair of springheld clamping jaws on each of said carriages arranged to travel adjacent the underside of said track; a plurality of plunger casings mounted on said track; a springheld plunger in each of said casings arranged to be depressed and the lower end projected from the bottom of said track, the lower end of each plunger being formed into a cam block arranged to spread said clamping jaws, there being a plurality of registering openings and recesses in each of said plungers and its casing; springheld tumbler blocks in said recesses and openings arranged to lock said plunger in elevated position but to release said plunger when properly adjusted; a plurality of vertically swinging leaves mounted on each casing and co-operating with said tumbler blocks to operate the same; said leaves projecting downwardly through slots in said track and into the path of laundry tags carried by said clamping jaws; a swinging arm carrying a pin arranged to register with tags carried by said clamping jaws and associated with each of said plungers; means operable by each of said plungers for operating said arm to swing said pin into registration with said clamping jaws; a guide rod associated with said arm and arranged to register with said pin when swung into a different position; means operable by said carriage for swinging said pin into registration with said guide rod; an endless flexible conveyor co-operating with said pin and guide rod and arranged to move tags from said pin onto and along said guide rod; means operable by said carriage for operating said last-named endless conveyor; a cam blade on said guide rod arranged to open laundry tags moving along said guide rod; two laterally extending pins on each of said plungers; two cam blades on each of said carriages arranged to engage said pins and elevate said plungers to reset the same; a universally operating plunger at the end of said track arranged to operate the clamping jaws on said carriages; and means for receiving laundry tags and transferring said tags to said carriage, substantially as described.

44. A sorting machine comprising a frame whereon is mounted an index head carrying a shaft provided with an indicator co-operating with an indicator dial; a spline on said shaft; and means for removing articles from said shaft and sorting them, substantially as described.

45. A sorting machine comprising an indicator dial; a shaft provided with an indicator co-operating with said dial; an index head carrying an indicator shaft having a spline on said shaft; two diametrically arranged revolving heads arranged to be brought alternatively into cooperative relation with said shaft; a pin on each head co-operating with said shaft; and sorting mechanism arranged to move articles from said pins and sort them, substantially as described.

46. A sorting machine comprising an indicator dial; an index head carrying a shaft provided with an indicator co-operating with said dial; a spline on said shaft; two diametrically arranged revolving heads arranged to be brought alternately into co-operative relation with said shaft; a pin on each head co-operating with said shaft; a travelling carriage arranged to remove articles from said pins; and discharge stations arranged to discharge articles from said carriage, substantially as described.

47. A sorting machine comprising an indicator dial; an index head carrying a shaft provided with an indicator co-operating with said dial; a spline on said shaft; two diametrically arranged revolving heads arranged to be brought alternately into co-operative relation with said shaft; a pin on each head co-operating with said shaft; a travelling carriage provided with springheld clamping jaws arranged to engage and remove articles from said pins, when moved out of co-operative relation with said shaft; and discharge stations arranged to discharge articles from said jaws, substantially as described.

48. A sorting machine comprising an indicator dial; an index head carrying a shaft provided with an indicator co-operating with said dial; a spline on said shaft; two diametrically arranged revolving heads arranged to be brought alternately into co-operative relation with said shaft; a pin on each head co-operating with said shaft; a travelling carriage provided with springheld clamping jaws, arranged to engage and remove articles from said pins, when moved out of co-operative relation with said shaft; a plurality of cam blocks cooperating with said carriage and arranged to shift into the path of said clamping jaws to open said jaws to release an article carried thereby; and means operable by an article carried by said clamping jaws for operating said cam blocks, substantially as described.

49. In combination with a sorting machine, a plurality of metallic laundry tags each provided along one edge with a notch and recess arrangement and with a central perforation having a lateral notch co-operating with the mechanism of said machine, substantially as described.

50. In combination with a sorting machine, a plurality of metallic laundry tags each provided with a central perforation having a lateral notch co-operating with the mechanism of said machine, substantially as described.

51. A sorting machine comprising a travelling carriage provided with means for carrying perforated laundry tags; a pin mounted on a swinging arm; said arm mounted on a swinging block; means for swinging said arm to bring said pin into registration with the perforation in a laundry tag on said carriage; means for swinging said block to swing said pin into a different position; a guide rod arranged to register with said pin when swung into said different position; and means for feeding laundry tags along said guide rod, substantially as described.

52. A sorting machine comprising a travelling carriage provided with means for carrying perforated laundry tags; a pin mounted on a swinging arm; said arm mounted on a swinging block; means for swinging said arm to bring said pin into registration with the perforation in a laundry tag on said carriage; means for swinging said block to swing said pin into a different position; a guide rod arranged to register with said pin when swung into said different position; means for feeding laundry tags along said guide rod; and a cam blade on said guide rod arranged to open laundry tags moving thereon, substantially as described.

53. A sorting machine comprising a travelling carriage provided with means for carrying perforated laundry tags; a pin mounted on a swinging arm, said arm mounted on a swinging block; means operable by a laundry tag carried by said carriage for swinging said arm to bring said pin into registration with the perforation of said laundry tag; means operable by said carriage for swinging said block to move said pin into a different position; a guide rod arranged to register with said pin when swung into said different position; an endless flexible conveyor co-operating with said guide rod to feed articles along the same; and means operable by said carriage for controlling the operation of said last-mentioned conveyor, substantially as described.

54. The combination with a guide rod, of a support therefor comprising two swinging arms set at an angle to each other and slotted to pass over said rod; and co-operating angularly positioned arms fitting the open ends of said slots, substantially as described.

55. The combination with a guide rod, of supports mounted on opposite sides of one end thereof; springheld rotatable members mounted on opposite sides of said rod; two bifurcated swinging arms mounted on one of said members at an angle to each other and slotted to pass over said rod; and two co-operating angularly positioned arms on the other of said members and fitting the open ends of said slots, substantially as described.

In testimony whereof I have signed my name to this specification.

ANGUS F. HANNEY.